United States Patent
Cordella et al.

(10) Patent No.: US 9,128,876 B2
(45) Date of Patent: Sep. 8, 2015

(54) MEMORY LOCATION SPECIFIC DATA ENCRYPTION KEY

(75) Inventors: Thomas Cordella, Tampa, FL (US); John Profumo, St. Petersburg, FL (US); James L. Tucker, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 13/311,593

(22) Filed: Dec. 6, 2011

(65) Prior Publication Data

US 2013/0145177 A1    Jun. 6, 2013

(51) Int. Cl.
  G06F 21/00    (2013.01)
  G06F 11/30    (2006.01)
  G06F 12/14    (2006.01)

(52) U.S. Cl.
  CPC ............ G06F 12/1408 (2013.01); G06F 21/00 (2013.01)

(58) Field of Classification Search
  CPC .................................. G06F 21/71; G06F 21/73
  USPC .......................................................... 713/193
  See application file for complete search history.

(56) References Cited

U.S. PATENT DOCUMENTS

| | | | |
|---|---|---|---|
| 5,058,164 A | 10/1991 | Elmer et al. | |
| 5,987,572 A * | 11/1999 | Weidner et al. | 711/155 |
| 6,075,858 A | 6/2000 | Schwartzman | |
| 7,185,205 B2 | 2/2007 | Launchbury et al. | |
| 7,451,288 B2 * | 11/2008 | Goettfert et al. | 711/164 |
| 7,853,803 B2 * | 12/2010 | Milliken | 713/190 |
| 7,912,223 B2 | 3/2011 | Osaki | |
| 7,979,716 B2 | 7/2011 | Fiske | |
| 8,001,374 B2 | 8/2011 | Wise | |
| 8,332,634 B2 * | 12/2012 | Derouet | 713/162 |
| 2002/0073326 A1 | 6/2002 | Fontijn | |
| 2003/0037248 A1 * | 2/2003 | Launchbury et al. | 713/193 |
| 2004/0103269 A1 * | 5/2004 | Stark | 712/228 |
| 2004/0117778 A1 * | 6/2004 | Sehr et al. | 717/152 |
| 2006/0177065 A1 * | 8/2006 | Halbert | 380/277 |
| 2007/0192592 A1 | 8/2007 | Goettfert et al. | |
| 2008/0059795 A1 * | 3/2008 | Vogel | 713/165 |
| 2008/0260159 A1 * | 10/2008 | Osaki | 380/277 |
| 2010/0095134 A1 * | 4/2010 | Srinivasan et al. | 713/193 |

OTHER PUBLICATIONS

Weidong Shi; Memory-centric Security Architecture; Year: 2005; Springer; pp. 1-16.*

DS5002FP Secure Microprocessor Chip, 25 pages, downloaded on Sep. 14, 2011, from http://pdfserv.maxim-ic.com/en/ds/DS5002-DS5002FP.

(Continued)

*Primary Examiner* — Shewaye Gelagay
*Assistant Examiner* — Monjour Rahim
(74) *Attorney, Agent, or Firm* — Shumaker & Sieffert, P.A.

(57) ABSTRACT

Contents of a memory are encrypted using an encryption key that is generated based on a random number and a memory location at which the contents are stored. Each of a plurality of locations of a memory can be associated with a respective unique pointer value, and an encryption key may be generated based on the unique pointer value and the random number. In some examples, the random number is unique to a power-up cycle of a system comprising the memory or is generated based on a time at which the data to be stored by the memory at the selected memory location is written to the memory.

20 Claims, 12 Drawing Sheets

(56) References Cited

OTHER PUBLICATIONS

Amit Singh, "A Taste of Computer Security," 6 pages, downloaded on Sep. 14, 2011, from http://www.kernelthread.com/publications/security/smemory.html.

David J. Wheeler, "A Bulk Data Encryption Algorithm," 9 pages, downloaded on Sep. 14, 2011, from http://www.cix.co.uk/~klockstone/wake.htm.

* cited by examiner

MEMORY LOCATION SPECIFIC DATA ENCRYPTION KEY

TECHNICAL FIELD

The disclosure relates to data encryption, and, more particularly, encryption of data stored by a memory.

BACKGROUND

Some digital electronic systems include a memory that stores data, such as instructions used to control the operation of the digital electronic system, proprietary data, intellectual property, or any combination thereof. In some cases, a digital electronic system that includes such a memory includes anti-tamper features that help protect the contents of the memory from unauthorized access.

SUMMARY

In general, the disclosure is directed to devices, systems, and techniques for encrypting contents of a memory using an encryption key that is generated based on a random number and the location of the memory at which the contents are stored, and devices and systems that implement the encryption algorithm described herein. Each of a plurality of locations of a memory can be associated with a respective unique pointer value, and an encryption key may be generated based on the unique pointer value and the random number. As a result, the encryption key used to encrypt data that is stored at a particular memory location is unique and specific to that memory location. The random number used to generate the encryption key changes over time. In some examples, a plurality of random numbers each associated with one or more respective memory locations may be used to generate the encryption key at different times during operation. In some examples, the random number is unique to a power-up cycle of a system comprising the memory or is generated based on a time at which the data to be stored by the memory at the selected memory location is written to the memory.

In some examples, the unique pointer value indicated by an internal memory address bus is translated to generate a translated pointer value; and data may be encrypted using the unique pointer value and then the encrypted data may be stored by the memory at a memory location corresponding to the translated pointer value. In addition, in some examples, the memory translation may also be used when storing unencrypted data in a memory or when storing data encrypted using an encryption key that is not memory location specific to the external memory.

In one example, an encryption key generation module generates the encryption key by at least determining a pointer value that is unique to a selected memory location and associated with the selected memory location, transforming the pointer value using a known algorithm (e.g., a non-linear algorithm) to generate a transformed pointer value, and combining the transformed pointer value with a random number to generate an encryption key. In some examples, the transformed pointer value is combined with the random number and a master key value to generate the encryption key.

In one example, the disclosure is directed to a method comprising selecting a memory location within a memory, generating an encryption key for encrypting data to be stored by the memory at the selected memory location, wherein generating the encryption key comprises generating the encryption key based on a random number and a pointer value that is unique to the memory location and associated with the memory location, and encrypting the data to be stored by the memory at the selected memory location using the encryption key. In some examples, the encrypted data is written to the memory at the selected memory location.

In another example, the disclosure is directed to a system comprising a memory configured to store data, the memory comprising a plurality of memory locations each associated with a respective unique pointer value, a processor configured to select a memory location of the plurality of memory locations to which data is to be written, a key generation module configured to generate an encryption key based on a random number and the unique pointer value associated with the selected memory location, and an encryption and decryption module configured to encrypt the data using the encryption key. In some examples, the processor writes the encrypted data to the memory at the selected memory location.

In another example, the disclosure is directed to a computer-readable medium containing instructions. The instructions cause a programmable processor to select a memory location within a memory, generate an encryption key for encrypting data to be stored by the memory at the selected memory location based on a random number and a pointer value that is unique to the memory location and associated with the memory location, and encrypt the data to be stored by the memory at the selected memory location using the encryption key.

In another example, the disclosure is directed to an article of manufacture comprising a computer-readable storage medium. The computer-readable storage medium comprises computer-readable instructions for execution by a processor. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a programmable processor to perform the techniques described herein. The computer-readable medium may be nontransitory.

The details of one or more examples are set forth in the accompanying drawings and the description below. Other features, objects, and advantages in addition to those described below will be apparent from the description and drawings, and from the claims.

DETAILED DESCRIPTION

An encryption algorithm for encrypting data stored by a memory to protect the data against authorized access is described in this disclosure. In addition, devices, systems, and techniques implementing the encryption algorithm are described. As described in further detail below, the encryption algorithm may be implemented to generate an encryption key that is unique to a location of a memory; data stored at the memory location may be encrypted and decrypted using the encryption key. For example, the encryption key may be based on a pointer value unique to the memory location and a random number. The unique pointer may be, for example, an address that identifies the location of data word within the memory or a packet identifier of a data packet that is used to transmit the data word to the memory. As a result, in some examples, each data word stored by a memory at a respective location is encrypted with a different encryption key. The random number used to generate the encryption key changes over time, such that for different data word stored by a memory may be encrypted with encryption keys generated with different random numbers. In addition, the random number may remain non-observable to an external viewer, e.g., external to the system comprising the memory.

The encryption algorithm described herein can be used to encrypt and decrypt data in any system that includes a memory in which data is encrypted and decrypted, and where a unique pointer exists to identify the location of the data in the memory, such as the location of each contiguous data word of a larger data block. A data word may be, for example, a fixed size group of bits that are handled by the system, or a component of the system, as a single unit. For example, the data word may be a unit of length used by the design of a processor of the system that accesses the data stored by the memory. In some examples in which the unique pointer includes a memory address, the memory location may be associated with a single memory address, while in other examples in which the unique pointer includes a memory address, the memory location may be associated with multiple memory addresses (e.g., a block of contiguous or non-contiguous memory locations). In this example, the encryption key used to encrypt the contents of the memory stored at the memory location may be based on one or more of the memory addresses. For example, a unique pointer may be associated with the block of multiple memory addresses.

Figure 1:
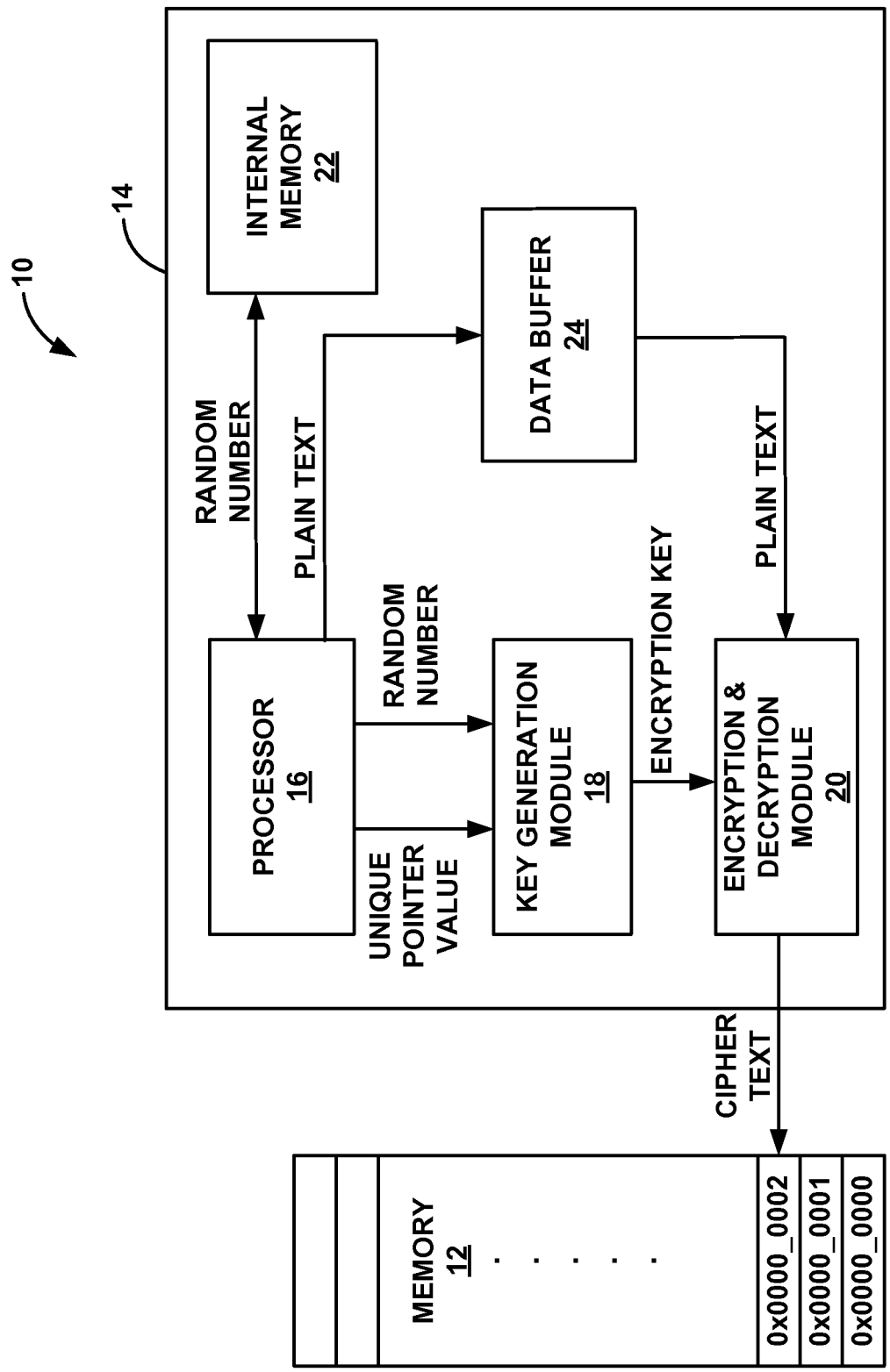
FIG. 1 is a functional block diagram of an example system that includes a memory and an encryption and decryption module that is configured to encrypt data stored by the memory using a memory location specific encryption key.

FIG. 1 is a block diagram illustrating an example system 10 that includes memory 12, and control system 14, which is configured to store (also referred to herein as "write") encrypted data to memory 12 and read encrypted data stored by memory 12. System 10 can be, for example, a digital electronic system. Control system 14 includes processor 16, encryption key generation module 18 (also referred to as "key generation module"), encryption and decryption module 20, internal memory 22, and data buffer 24.

Control system 14 can comprise any suitable arrangement of hardware, software, firmware, or any combination thereof, to perform the techniques attributed to control system 14 and processor 16, key generation module 18, and encryption and decryption module 20 herein. For example, control system 14 may include any one or more microprocessors, digital signal processors (DSPs), application specific integrated circuits (ASICs), field programmable gate arrays (FPGAs), or any other equivalent integrated or discrete logic circuitry, as well as any combinations of such components. Although processor 16, key generation module 18, and encryption and decryption module 20 are described as separate modules, in some examples, processor 16, key generation module 18, and encryption and decryption module 20 can be functionally integrated. For example, key generation module 18, and encryption and decryption module 20 may be provided by the same hardware. In some examples, processor 16, key generation module 18, and encryption and decryption module 20 correspond to individual hardware units, such as ASICs, DSPs, FPGAs, or other hardware units, or one or more common hardware units.

Memory 12 is configured to store data in encrypted form (also referred to herein as "cipher text" form). Memory 12 includes any volatile or non-volatile media, such as a random access memory (RAM), read only memory (ROM), non-volatile RAM (NVRAM), electrically erasable programmable ROM (EEPROM), flash memory, and the like. In some examples, memory 12 may be external to control system 14, e.g., may be external to a package in which control system 14 is housed. For example, control system 14 may be defined by a semiconductor device or a plurality of semiconductor devices and may be housed in a semiconductor package, and memory 12 may be external to that semiconductor package. In some of these examples, electrical signals transmit between memory 12 and control system 14 via one or more electrically conductive pathways (e.g., a data bus and address bus). In other examples, memory 12 and control system 14 may wirelessly communicate with each other.

Data stored by memory 12 can include, for example, critical program information for the operation of system 10, protected intellectual property, and confidential information, such as classified information to which access is restricted by law or regulation to particular groups of persons. Encrypting data stored by memory 12 using the memory location specific encryption key described herein may help reduce unauthorized technology transfer, help protect any technological advantage provided to a particular entity from the knowledge and/or use of the stored data, and protect technological competitiveness afforded by the use of the stored data. For example, encrypting data stored by memory 12 may help minimize the possibility that system 10 may be reverse engineered by decreasing the accessibility to the contents of memory 12.

Processor 16 of control system 14 is configured to control the writing of data to memory 12 and reading of data from memory 12. In this way, processor 16 may also be referred to as a memory controller. As described in further detail below, the data written to memory 12 by processor 16 is encrypted by encryption and decryption module 20 prior to being written to memory 12, and the data read from memory 12 by processor 12 is decrypted by encryption and decryption module 20.

In some examples, processor 16 may be configured to select (e.g., determine) the data to be written to memory 12. For example, processor 16 may generate the data or may receive the data to be written to memory 12 from an external source, such as an external component (e.g., an external computing device) or a user interface (not shown in FIG. 1) that is electrically and communicatively connected to processor 16. In addition, in some examples, processor 16 may be configured to select a location within memory 12 to which the data is to be written. Processor 16 may include a memory bus and an address bus (also referred to as a memory address bus), which is used to specify a location within memory 12 to which data is written to or read from.

Processor 16 can select a location within memory 12 to which the selected data is written using any suitable technique. In some examples, processor 16 may write data to memory 12 using data words of predetermined sizes (e.g., predetermined number of bits or bytes), such that data words of predetermined sizes are stored by memory 12. Memory 12 may, for example, include a larger data block comprising a plurality of data words of similar or identical sizes. In other examples, processor 16 may be configured to write data to memory 12 via single bytes. In these examples, data too large to be stored in a single byte may reside in multiple bytes occupying a sequence of consecutive addresses.

When processor 16 selects a location within memory 12 for storing the selected data, processor 16 may also select a pointer value that is unique to the memory location and associated with the memory location. The memory location may be, for example, the memory address specified by the memory address bus of processor 16 or the memory address specifying a physical space within memory 12. In some cases, the memory address specified by the memory address bus of processor 16 or the actual memory address used by memory 12 may be the same. In other examples, the memory address specified by the memory address bus of processor 16 or the actual memory address used by memory 12 may be different (e.g., linearly or non-linearly linked).

In some examples, the unique pointer value may only associate with the respective memory location and not associated with any other memory locations. For example, processor 16 may select a location within memory 12 by selecting a memory address, which may be a unique number associated with the data word or individual (single) byte. A memory location may, for example, identify a physical location within memory 12. Each memory location within memory 12 may be associated with a respective memory address, such that when processor 16 selects a memory address to read data from or write data to, only one location in memory 12 is accessed by processor 16. In this way, the memory address may be a unique pointer value for a memory location. The memory address may also be referred to as an absolute address, an explicit address, or a specific address in some examples. An example of a memory address is, for example, a 32 bit memory address. Another example of a memory address is a logical memory address. Data within memory 12 may be organized using logical addresses, which may map to physical addresses.

In examples in which memory 12 and control system 14 communicate over a communication channel, whether wired or wireless, the unique pointer value used to generate an encryption key may be, for example, a packet identifier for a data packet sent over a communications link, where the data packet includes the data to be written to the selected memory location.

As discussed above, it may be desirable to minimize or even prevent tampering with system 10 in order to protect the contents of system 10, such as the contents stored by memory 12, the configuration of the components of system 10, and the like. Various techniques can be used to help prevent tampering with system 10. For example, in examples in which control system 14 is integrated into a single ASIC or FPGA, some components of system 10 may be integrated into a well defined periphery (e.g., the periphery defined by a package in which the integrated circuit is housed). The integrated circuit housing or other package in which control system 14 and system 10 are contained (e.g., partially or completely enclosed) can act as a physical barrier that protects the components of system 10 from unauthorized access.

In addition, in some examples, an electronic tamper sensor can be integrated into the package in which control system 14 is housed and/or the package in which system 10 is housed or placed (e.g., a printed board on which system 10 is mounted is placed or a housing in which the printed board is placed). The electronic tamper sensor may be configured to detect tampering with system 10, such as by detecting physical movement of one or more component of system 10, impacts of a certain magnitude that indicate physical tampering, and the like. The electronic tamper sensor may be configured to take one or more actions in response to the detection of tampering. For example, the electronic tamper sensor can be configured to generate a notification to a user or processor 16 in response to detecting physical tampering, and, in some response, the user, processor 16, or another component can cause data stored by memory 12 and internal memory 22 to be inaccessible, such as by physical, chemical, or electrical destruction or by deletion of stored encryption keys or information necessary to determine the encryption key (e.g., a random number used to generate the encryption key) from internal memory 22.

In the example shown in FIG. 1, memory 12 is external to control system 14, e.g., if control system 14 is on one or more integrated circuits, memory 12 can be physically separate from the integrated circuit. In some cases, it may be practical and desirable to implement additional memory 12 separate from control system 14, such as when relatively large amounts of randomly accessible memory is needed to support the operation of system 10 and it is not practical to incorporate the memory on the same one or more integrated circuits as control system 14.

In some examples, the data to be written to memory 12 under the control of processor 16 is stored in data buffer 24. In some examples, data buffer 24 can be a part of internal memory 22 of control system 14 or can be separate from internal memory 22. Internal memory 22 is internal to control system 14 and, in some examples, stores instructions for execution by processor 16 for operation of processor 16 and other data used during operation of control system 14. In some examples in which control system 14 is an ASIC, FPGA or another integrated circuit, or otherwise comprises an ASIC, FPGA or another integrated circuit, internal memory 22 can be a memory element of the integrated circuit (e.g., a memory block or a flip-flop).

Electrically conductive pathways between control system 14 and components external to system 14, including memory 12, may provide a channel through with which system 10 can be electrically tampered. For example, an adversary (e.g., an unauthorized party) may probe electrical signal traces between control system 14 and the external components, and the information gathered through the probing may provide an adversary with the information with which the design of system 10 may be reverse engineered. In order to help minimize the possibility that any information obtained from probing the electrical signal traces between memory 12 and control system 14, control system 14 is configured to encrypt data that is written to memory 12 using an encryption key that is unique to the memory location at which the data is stored. As a result, any information an adversary may obtain from probing the electrical signal traces between memory 12 and control system 14 otherwise obtaining data stored by memory 12 will be unintelligible to the adversary unless the adversary is able to decrypt the retrieved data. However, to decrypt the data stored by memory 12, the encryption key must be known. The encryption algorithm implemented by system 14 to encrypt the contents of memory 12 increases the difficulty with which the adversary may determine the encryption keys used to encrypt the contents of memory 12.

The encryption algorithm with which control system 14 encrypts data stored by memory 12 results in a unique encryption key for each memory location of memory 12. As a result, the adversary must determine multiple encryption keys in order to decrypt data stored at more than one location of memory 12. Indeed, even if the adversary determines one encryption key for one location of memory 12, the data stored at the location may not provide the adversary with any useful information due to its relatively small content (e.g., a single data word), and the data stored at multiple memory locations may be necessary to obtain useful information (e.g., a sufficient amount of information to reverse engineer system 10). Thus, by generating memory location specific encryption keys, system 10 increases the difficulty with which an adversary may decrypt data stored by memory 12.

Use of encryption keys that are dependent on a memory location may provide a cryptographically secure algorithm for enciphering data stored by memory 12. The encryption algorithm that uses the memory location specific encryption keys may also help mitigate electronic tampering from at least two types of side channel attacks: simple power analysis and differential power analysis. A side channel attack may be, for example, an attack on system 10 based on information that is obtained from an analysis of the physical operation of system 10, such as the power consumed by system 10 during its operation and/or the sounds generated by system 10 during its operation. Side channel attacks may compromise the security of electrical devices (e.g., an ASIC, FPGA or another semiconductor device).

Simple power analysis is a side channel attack which involves visual examination of the power consumption (e.g., the current used) of an electrical device (e.g., system 10) over time. The electrical device may consume different amounts of power consumption as it performs different operations, such that variations in power consumption over time may evidence the different operations of the device. If the device is a cryptographic system that encrypts stored data, an adversary may be able to extract encryption keys from the power consumption profiles. Within some cryptographic systems, the unique power profiles may alert the adversary to the cryptographic standard being used. For example, systems that encrypt data using the Data Encryption Standard (DES) use 16 rounds, which are 16 identical stages of processing (e.g., transforming) used to convert plain data into ciphered data. These rounds can easily be seen on a digital oscilloscope and may tip off the adversary to the implementation of the DES to encrypt the stored data. As another example, systems that encrypt data using the Advanced Encryption Standard (AES) may use 10, 12, or 14 rounds to convert plain data into ciphered data, depending on the selected key strength.

Differential power analysis is a side channel attack in which an adversary may extract an encryption key (or other secret keys) by analyzing their power consumption from the outside of an electrical device. Differential power analysis may be a more advanced form of power analysis compared to simple power analysis because an adversary may be able to compute intermediate values within cryptographic computations by statistically analyzing data collected from multiple cryptographic operations. Differential power analysis attacks may be successful when the adversary is able to accumulate a statistically significant quantity of power samples over repeated cryptographic encryption/decryption operations using the same encryption key.

Other types of side channel attacks include correlation power analysis and a template attack. Correlation power analysis is similar to differential power analysis, and may be a side channel attack in which an adversary may determine secret encryption keys by correlating instantaneous power consumption to predicted nominal power consumption values. A template attacked may be used by an adversary to evaluate noise emanating from an integrated circuit of system 10; the noise may be expected to follow a Gaussian distribution. The adversary may sample noise from system 10 and compare the sampled noise against a probabilistic noise profile, such can be used to reveal secret keys.

System 10 is configured to encrypt contents of memory 12 (referred to herein as "data" stored by memory 12) using key generation module 18 and encryption and decryption module 20. Key generation module 18 is configured to generate an encryption key with which encryption and decryption module 20 encrypts and decrypts data stored by memory 12, where the encryption key is unique to the location of memory 12 in which the data is stored. Key generation module 18 is described in further detail with respect to FIG. 2. Encryption and decryption module 20 may, in some examples, cache recently determined encryption keys (e.g., a predetermined number of recently determined encryption keys), e.g., in a page key cache memory.

Figure 2:
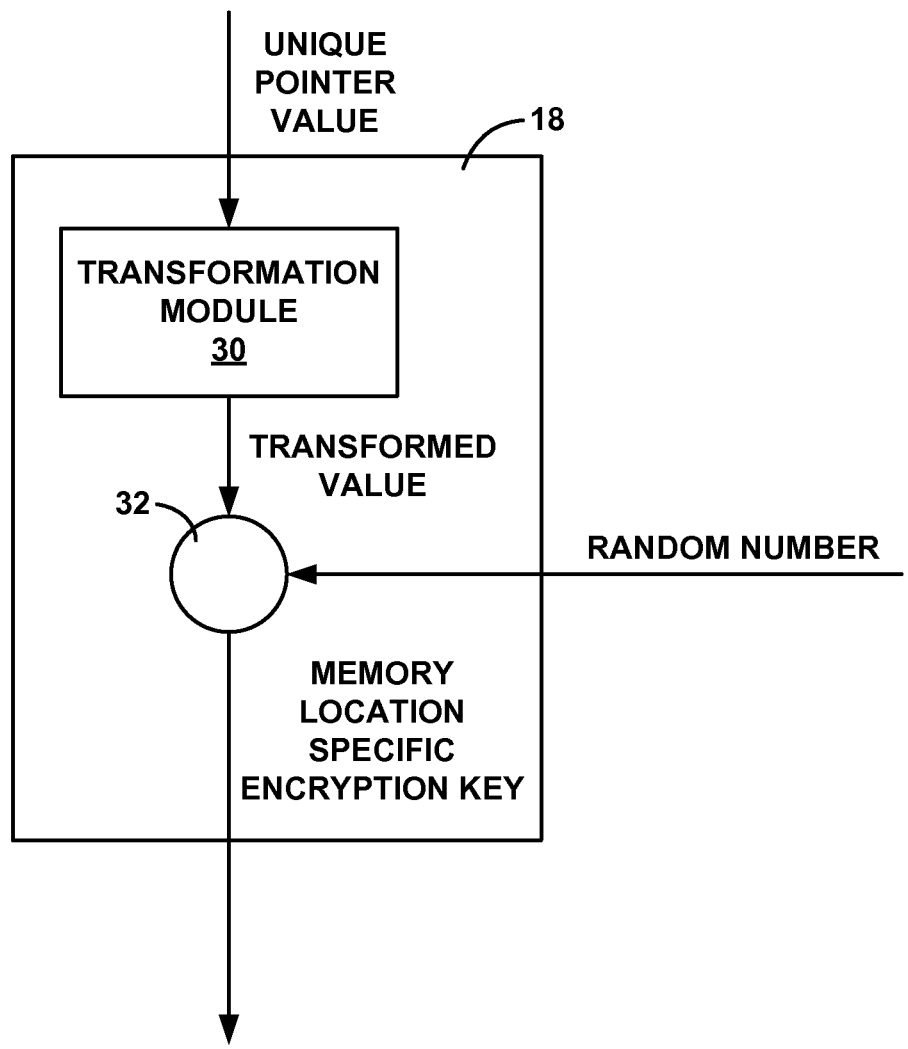
FIG. 2 is a functional block diagram of an example encryption key generation module of the system of FIG. 1, where the encryption key generation module is configured to generate a unique encryption key for data stored to a particular memory location based on a random number and a unique pointer value associated with the memory location.

As shown in FIGS. 1 and 2, key generation module 18 receives, as an input, a unique pointer value from processor 16, where the unique pointer value is unique to a location of the memory. For example, the unique pointer value may be a memory address indicates the specific location of memory 12 at which data is to be stored. Key generation module 18 also receives, as an input, a random number. The random number can have suitable size (e.g., bits). In one example, the random number includes 128 bits. In other examples, the random number may be generated by a processor external to system 14.

In the example shown in FIG. 1, the random number is generated internal to control system 14, such as by processor 16. For example, processor 16 may include a random number generator that generates the random number, e.g., using a random number generation algorithm. In these examples, the random number may also be referred to as a pseudo-random number. In other examples, processor 16 may generate a truly random number, e.g., using one or more oscillators, radioactive decay models, or digital logic.

In some examples, the random number used to generate an encryption key is generated at some predetermined time, such as upon power-up of system 10, at regular intervals (e.g., once every hour, every day, or the like), or according to some other predetermined schedule with which processor 16 is programmed. As a result, over time and through the use of system 10, a plurality of random numbers may be used to encrypt the contents of memory 12. In some examples, the random number is generated ad hoc (e.g., not generated until the current power cycle, time, or the like), such that the random number is not predetermined.

As shown in FIG. 1, in some examples, processor 16 may store the random number in internal memory 22. If processor 16 generates the random number, processor 16 may store the random number in response to generation of the random number. In the example shown in FIG. 1, system 10 uses a symmetric key based encryption algorithm in which the same encryption key is used to encrypt data stored by memory 12 and decrypt data read from memory 12. Thus, the random number used to generate the unique encryption key for each memory location is stored by internal memory 22 for later retrieval by processor 16, e.g., so that system 14 (e.g., key generation module 18) can, at a later time, determine the encryption algorithm used to encrypt the data contents stored at the selected memory address in order to decrypt the data. This encryption key may also be referred to as a decryption key.

In some examples in which processor 16 stores the random number, processor 16 may associate information with the random number that will later enable processor 16 to associate the random number with a particular memory location. For example, processor 16 may store information that indicates during which power cycle data was written to the memory location or at which time encrypted data was written to the memory location, along with an indication of when each stored random number was generated (e.g., an indication of the power cycle or day and time the random number was generated). Instead, or in addition, processor 16 may store in internal memory 22, a memory location and the random number used to generate an encryption key associated with the memory location at the time data was written to the memory location. Because memory 22 is internal to control system 14, the channels through which an adversary may obtain the stored random number may be minimized compared to if the random number is stored by an external memory. However, in some examples, processor 16 may store the random number in a memory external to control system 14. For example, the random number may be stored in an external memory in a manner that makes it difficult for an adversary to associate a particular random number with a particular memory location.

In some examples in which processor 16 generates the random number at predetermined times (e.g., upon power-up of system 10), memory 12 may be cleared and a new set of information may be stored by memory 12 at each of those predetermined times (e.g., at every power-up cycle). For example, memory 12 may be random access memory that only stores information for use during a single power-up cycle, which may, in some examples, correspond to a single mission of a larger system in which system 10 is incorporated. In these examples, only one encryption key (and one random number) is used to encrypt contents of memory 12 and less storage may be required to store the information (e.g., the random number) required to decrypt the contents of memory 12. However, in other examples, memory 12 retains data between multiple random number generation cycles (e.g., power-up cycles) and internal memory 22 may be needed to store the encryption keys (e.g., random numbers) so that data stored by memory 12 can be later decrypted.

FIG. 2 is a functional block diagram of an example encryption key generation module 18, which is configured to generate a unique encryption key for data stored to a particular memory location based on a random number and a unique pointer value associated with the memory location. In examples in which a single data word is stored at the memory location, the unique encryption key generated based on the memory location is also a unique key for the data word. As shown in FIG. 2, a unique pointer value associated with the memory location, such as a memory address or a unique packet identifier for a packet of data sent over a communication channel (e.g., a wired or wireless communication channel), undergoes a transformation, which is shown as being implemented by transformation module 30 of key generation module 18. Transformation module 30 may be implemented by hardware, software, firmware or any combination thereof.

Transformation module 30 implements any suitable transformation algorithm (e.g., a transformation function) that results in a unique value. The transformation algorithm can be selected such that there is one-to-one mapping of input value (e.g., the unique pointer value) to output value (e.g., the transformed value), and such that there is no aliasing (e.g., such that two or more input values do not result in the same output value). In some examples, the transformation algorithm is non-linear, and in these examples, no proportional relationship exists between the value input to the transformation algorithm and the value output from the algorithm. Using these parameters and other parameters, the selected transformation algorithm may be selected such that it is resistant to linear and differential cryptanalysis, as well as algebraic attacks.

An example of a non-linear transformation algorithm that transformation module 30 may implement to transform the unique pointer value includes a Substitution-box (also referred to as an "S-box"), which performs substitutions between an input and an output. In some examples, the Substitution-box is a look-up table that associates a pointer value with a transformed value. Instead of, or in addition to, the Substitution-box, in some examples, transformation module 30 may transform the unique pointer value using an independent crytopographic algorithm, such as using AES, RC5, or DES algorithms, or any combination thereof. However, the transformation algorithm implemented by transformation module 30 to transform a unique pointer value to a transformed pointer value is not necessarily cryptographic in all examples.

Transformation module 30 outputs a transformed value, which results when the unique pointer associated with the memory location undergoes the transformation. The transformed value is combined with the random number, as shown in FIG. 2, and the result of this combination is a memory location specific encryption key. Combination function 32 can be any suitable combination function, such as a bitwise XOR function. In some examples, combination function 32 is a function in which all of the bits of the input affect the bits of the output. In some examples, combination function 32 is more than just a logic gate, and can be, for example, a non-linear function, a hash function, a cryptographic function, a look-up table, and the like. In some examples, combination function 32 is selected such that all of the bits of the input effect the bits of the output.

In some examples, key generation module 18 combines the pointer value with a first random value before passing the value through the transformation module 32 to generate the transformed value. The first random value can be the same as, or different than, the random number used combined with the transformed value, which can be referred to as a "second" random number for ease of description and without regard to the order in which the random numbers are generated. As with the second random number, in some examples, processor 16 (or another processor internal to or external to control system 14) generates the first random value at some predetermined time, such as upon power-up of system 10, at regular intervals (e.g., once every hour, every day, or the like), or according to some predetermined schedule with which processor 16 is programmed. The timing with which the first random number is generated may be the same as, or different than, the timing with which the second random number is generated.

Generating an encryption key using a random number may provide another safeguard against the breaking (e.g., reverse engineering) of the encryption keys used to encrypt data stored by memory 12 in addition the safeguard provided by utilizing an encryption key unique to a specific memory location (e.g., based on the unique pointer value). Because the random number periodically changes, e.g., with every power-up cycle, with every hour, or according to another schedule, even if one encryption key is cracked and the random number determined, key generation module 18 implements different key values to generate the encryption key based on the time at which the encryption key is generated.

Even if an adversary gains knowledge of the random number, the adversary may only use this number to determine the encryption key for the data encrypted and stored in memory 12 at the same time the respective random number was used (e.g., the same power-up cycle, the same time, etc.). The adversary may not have access to such information. Moreover, even if the random number is known, the adversary must also determine, for each memory location, the transformation algorithm used to transform the unique pointer value, the memory location, and the combination function used by key generation module 18 to generate the encryption key. For at least these reasons, an encryption key that uses both a random number and a unique pointer value to encrypt data stored to a specific memory location may provide a cryptographically secure encryption technique.

Key generation module 18 outputs the memory location specific encryption key, as shown in FIG. 1, which is received by encryption and decryption module 20 as an input. Encryption and decryption module 20 is configured to encrypt data to be written to memory 12 using the location specific key encryption key generated by key generation module 18. Encryption and decryption module 20 may encrypt the data prior to processor 16 writing the data to memory 12 (directly or indirectly via module 20). Encryption and decryption module 20 may be configured to encrypt and decrypt data using any suitable technique, such as by implement an AES algorithm, an DES algorithm, an RC5 algorithm, or any combination thereof.

In some examples, encryption and decryption module 20 implements a block cipher algorithm to encrypt data, such that data is processed predetermined word sizes. For example, if encryption and decryption module 20 utilizes an AES algorithm, plain or cipher text is processed in 128-bit word sizes (e.g., a 128-bit word is input to and output from encryption and decryption module 20). Thus, processor 16 may access memory 12 in word sizes that is based on the word size with which encryption and decryption module 20 encrypts data. Because encryption and decryption module 20 may process words having a size different than the size of the memory locations, in some examples, processor 16 may select a unique pointer value that spans more than one memory location. However, the selected pointer value may still be based on a pointer value unique to at least one memory location in the group of memory locations. In this way, data stored by memory 12 may still be enciphered using multiple encryption keys that are based on a memory location at which the data is stored. Each memory location or group of two or three (or more in some cases) memory locations may have a different cipher function, such that even if an adversary cracks one encryption code, only the data for stored at the respective location may be determined.

For example, in the case of an AES algorithm, if memory 12 is configured as 64-bit RAM, system 10 may be configured such that processor 16 accesses 128 bits simultaneously, where the 128 bits correspond to two memory locations having respective pointer values. The data written or read from the 128 bits simultaneously may be encrypted or decrypted, respectively, using an encryption key generated with a predetermined one of the pointer values.

As another example, a unique pointer value may span two physical memory locations in order to accommodate the word size of cipher text output by encryption and decryption module 20. For example, if memory 12 is configured as 64 bit RAM, a 128-bit encrypted word output by encryption and decryption module 20 may be stored in two contiguous locations within memory 12. A single pointer value may then be used to encrypt and decrypt the data; processor 16 may select the pointer value that is used to generate the encryption key using some predetermined algorithm (e.g., the lowest pointer value or the highest pointer value).

Encrypting data stored by memory 12 with an encryption key that is generated based on a unique pointer value associated with a location in memory 12 in which the data is stored and a random value may be more cryptographically secure than using one solitary key to encrypt and decrypt large blocks of data. Because each data word stored by memory 12 is associated with its own unique encryption key, an adversary cannot simply take large blocks of data and attempt to break the encryption numerically. Instead, the adversary must determine the boundaries between contiguous pieces of data enciphered with different encryption keys, and solve each location specific encryption key.

Moreover, the use of a random number in addition to, or instead of, a master key value (discussed in further detail below) may further complicate the breaking of the encryption key implemented by system 10 because an adversary cannot simply work backwards through a cryptographic transformation to determine a master key value that may be used to break the encryption keys for each of the data words stored by memory 12. Instead, multiple random numbers are used to encrypt data stored by memory 12, such that an adversary must figure out each of the random values and associate each of the random values with a particular data word in order to break the encryption. The manner in which the random values are generated may be difficult to ascertain to the adversary. For example, if the random number is unique to the power-up cycle of system 10, the adversary must be able to determine when a particular data word was written to memory 12, the power-up cycle during which the data word was written to memory 12, and the random number associated with the power-up cycle in order to determine the random number that was used to generate the encryption key associated with the location in memory 12 in which the data word is stored.

The encryption algorithm described herein that uses the unique pointer value associated with a location in memory 12 to generate the encryption key for a particular data word stored in memory 12 at the location may also reduce the overhead associated with the encryption/decryption processing compared to other types of systems that may use multiple encryption keys to encrypt data stored by a memory. For example, the encryption keys unique to respective locations in memory 12 may be determined relatively quickly by encryption key generator 18, which may eliminate the need to store each generated encryption key in an internal look up table. While the random numbers used to generate an encryption key may be stored, the random numbers may be less cumbersome to store and retrieve than an encryption key.

In some cases, however, such as during the encryption and/or decryption of large blocks of data using symmetric cryptographic algorithms that use a key schedule (e.g., AES, DES, or RC5), encryption key generator 18 may determine a plurality of encryption keys at once (e.g., during a single round of data ciphering or deciphering), which may impose a performance penalty (e.g., a time delay) on system 10. A key expansion algorithm may be implemented to determine the key schedule, where the key expansion algorithm is used to determine the encryption keys for a particular round of data ciphering or deciphering. The penalty may be more pronounced during some decrypt operations in which encryption and decryption module 20 uses a key schedule that is unrolled and then used in reverse, such that the last schedule key entry is used first. In some encryption operations, encryption and decryption module 20 may use the key schedule in order so the key schedule can be expanded concurrent with the encryption process, which may speed up on the encryption process compared to the decryption process.

As discussed above, a differential power analysis is a side channel attack that some adversaries may implement in order to obtain information that may be used in attempts to break an encryption key. When implementing the encryption algorithm described herein with a symmetric cryptographic algorithm that uses a key schedule (the algorithm with which a plurality of encryption keys are determined), the susceptibility of system 10 to differential power analysis may be reduced compared to systems that do not use memory location specific encryption keys. A differential power analysis side channel attack may be performed by collecting a statistically significant amount of enciphered data, and correlating the sampled data with concurrently taken power readings of system 10. Once the power data is accumulated, the adversary may make statistical guesses about the values within the key schedule. Successfully determining the key schedule may allow the adversary to perform the key schedule algorithm in reverse in order to determine the master key value used to generate the encryption keys, and, in some encryption systems, once the master key value is determine, the encryption for all the stored data may be determined. The differential power analysis side channel attack may be more effective when repeated power readings of system 10 can be taken with the same key over along period of time.

In contrast to a system that uses the same master key value to encrypt large blocks of data, the encryption algorithm described herein uses an encryption key that is based on a unique pointer value for a particular memory location, such that the encryption key is unique for each memory location. The unique non-linear address translation function implemented by key generation module 18 is used to transmute a key schedule. As a result, the key schedule will be different for any two locations in memory 12 (e.g., for any two pointer values), and, due to the nature of the transformation under which the unique value undergoes, no two contiguous locations may have similar key schedules.

The encryption keys specific to a memory location may force an adversary to collect differential power analysis traces associated with specific memory locations in order to solve for each unique encryption key, which increases the complexity of the attack. Collection of the requisite number of samples to perform differential power analysis may become cumbersome, such as in situations in which the adversary does not have access to the entity initiating the operations. For example, an embedded processor may only access external memory 12 as a result of a cache miss, such that collecting a sufficient number of samples to perform the differential power analysis may take a relatively long amount of time. In some applications of system 10, it may be possible to reduce the number of accesses by processor 16 to each memory address, such that the number of power tracings associated with the address is below the threshold required to effectively perform differential power analysis.

Figure 3:
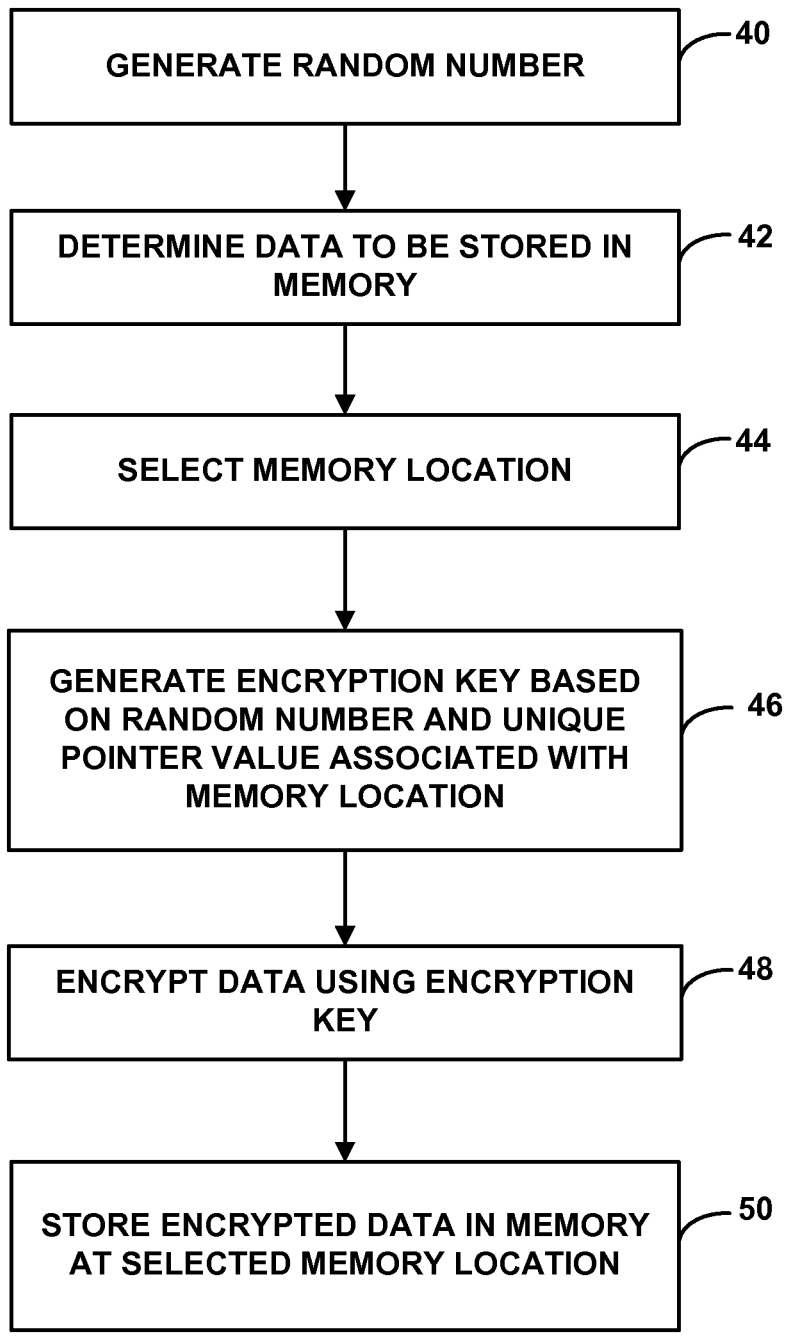
FIG. 3 is a flow diagram of an example technique for encrypting data stored at a particular location in a memory using an encryption key unique to the memory location.

FIG. 3 is a flow diagram of an example technique with which system 10 may encrypt data stored by memory 12. The technique shown in FIG. 3 may be implemented, for example, during a write operation controlled by processor 16 of system 15 or a processor of another device. While FIG. 3 is described with respect to system 10 (FIG. 1), in other examples, the technique shown in FIG. 3 can be implemented by another system alone or in combination with system 10. In accordance with the technique shown in FIG. 3, processor 16 generates a random number (40). As discussed above, processor 16 may periodically generate a random number and may also store the random number in internal memory 22 for later retrieval. Processor 16 may also determine data to be stored in memory 12 (42), and, in some examples, may output the data via a data bus to data buffer 24. Processor 16 may determine the data to be stored in memory 12 by, for example, receiving the data from an external source (e.g., another electrical device or user input), or generating the data.

Processor 16 selects the memory location for storing the determined data (44), e.g., based on instructions stored by internal memory 22 and executed by processor 16. The instructions may dictate, for example, the order in which memory 12 is written to. Processor 16 may generate the random number (40), determine the data to be stored in memory 12 (42), and select the memory location (44) in any particular order. Moreover, in other examples, another component ma control one or more of these actions independently or in combination with processor 16.

In the technique shown in FIG. 3, key transformation module 18 generates an encryption key that is unique to the selected memory location based on the random number and a unique pointer value associated with the memory location (46). As discussed above, key transformation module 18 may transform the unique pointer value, e.g., via a non-linear transformation algorithm, and combine the transformed pointer value with the random number to generate the encryption key. After the encryption key is generated, under the control of processor 16, encryption and decryption module 20 encrypts the data (determined by processor 16) using the encryption key (48) and stores the encrypted data in memory 12 at the selected memory location (50). In some examples, data buffer 24 provides the plain text to be encrypted to encryption/decryption module 20. In other examples, processor 16 provides the plain text directly to encryption/decryption module 20.

Figure 4:
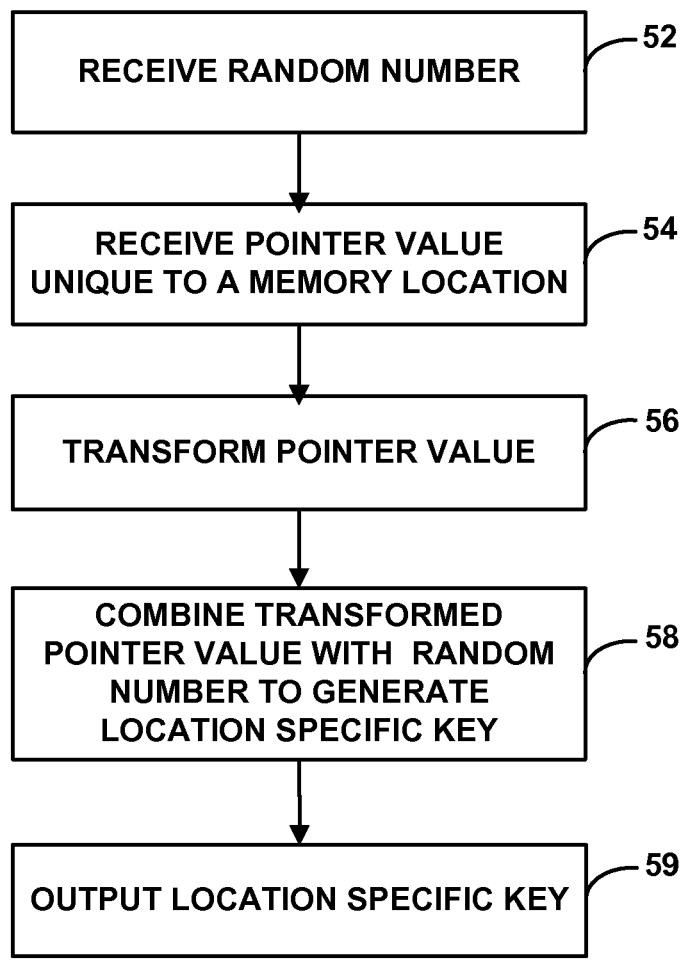
FIG. 4 is a flow diagram of an example technique for generating an encryption key based on a random number and a unique pointer value associated with a particular memory location.

FIG. 4 is a flow diagram of an example technique with which key generation module 18 may generate an encryption key. While FIG. 4 is described with respect to key generation module 18 (FIGS. 1 and 2), in other examples, the technique shown in FIG. 4 can be implemented by another system alone or in combination with key generation module 18.

In accordance with the technique shown in FIG. 4, key generation module 18 receives a random number (52) and receives the pointer value unique to a memory location to which data encrypted using the encryption key generated by key generation module 18 is to be stored (54). Key generation module 18 may, for example, receive the random number and unique pointer value from processor 16 or internal memory 22. After receiving the unique pointer value, key generation module 18 transforms the pointer value, thereby generating a transformed pointer value (56). In some examples, key generation module 18 implements a non-linear transformation algorithm to transform the pointer value.

After the pointer value is transformed, key generation module 18 may combine the transformed pointer value with the random number to generate the memory location specific encryption key (58). Key generation module 18 may then output the memory location specific encryption key, e.g., to encryption and decryption module 20 (59).

Other techniques that utilize a unique pointer value and a random number to generate an encryption key are contemplated. For example, as discussed above, prior to transforming the unique pointer value, key generation module 18 may combine the unique pointer value with a random number (the same as or different than the random number combined with the transformed pointer value (58)).

Figure 5:
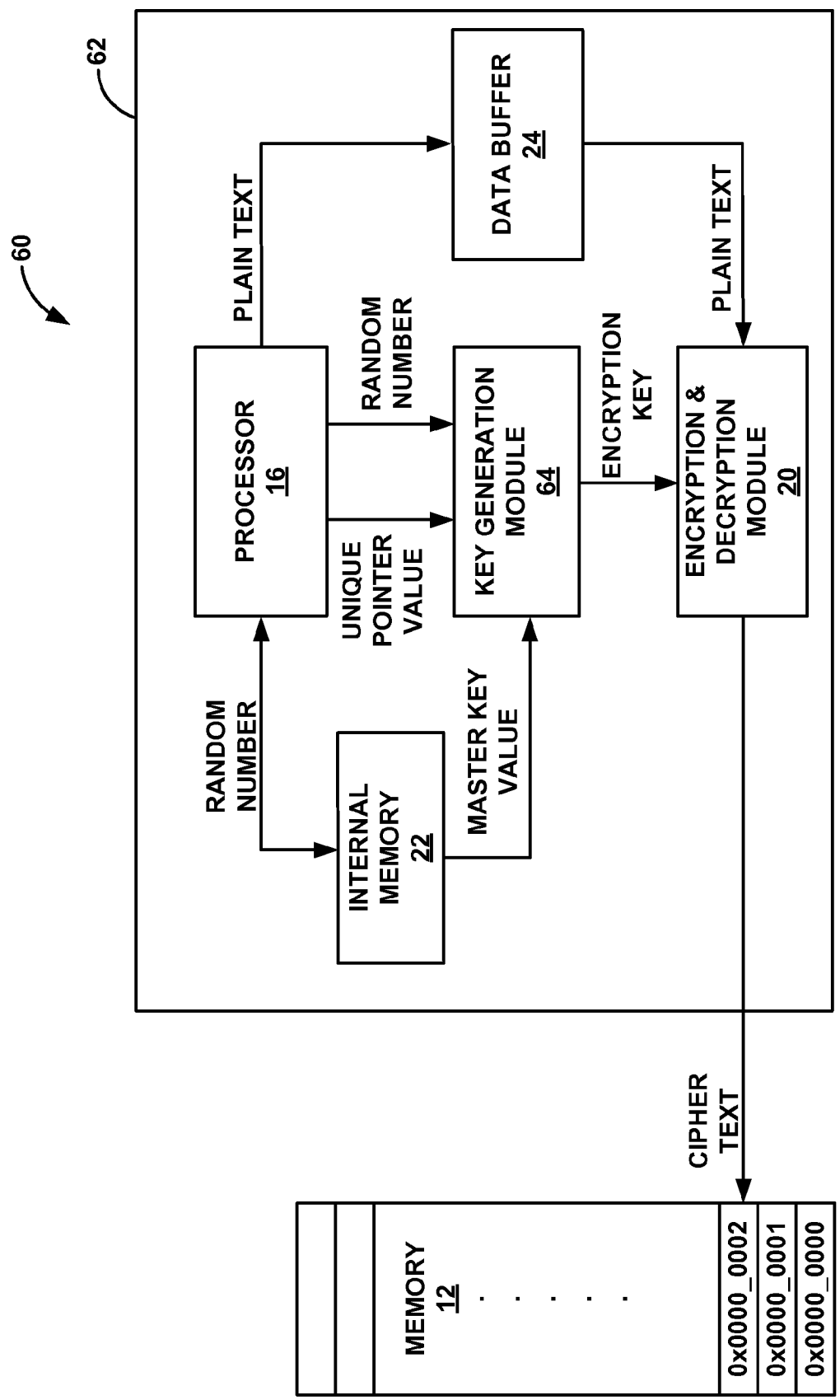
FIG. 5 is a functional block diagram illustrating another example system that includes a memory and an encryption and decryption module that is configured to encrypt data stored by the memory using a memory location specific encryption key.

In some examples, key generation module 18 of control system 14 may be configured to generate an encryption key using a master key value in addition to a random number. An example of such a system 60 is shown in FIG. 5. System 60 includes memory 12 and control system 62, which is similar to control system 14 (FIG. 1), but is configured such that both a random number and master key value are input to key generation module 64. Key generation module 64 is similar to key generation module 18 (FIGS. 1 and 2), but is configured to generate an encryption key based on a unique pointer value, a random number, and a master key value.

In the example shown in FIG. 5, unlike the random number, the master key value remains the same for each encryption key generated by key generation module 18. The master key provides an additional complexity to the encryption key, and provides another value an adversary must determine in order to crack the encryption key. As shown in FIG. 5, in some examples, the master key value can be stored by internal memory 22.

Figure 6:
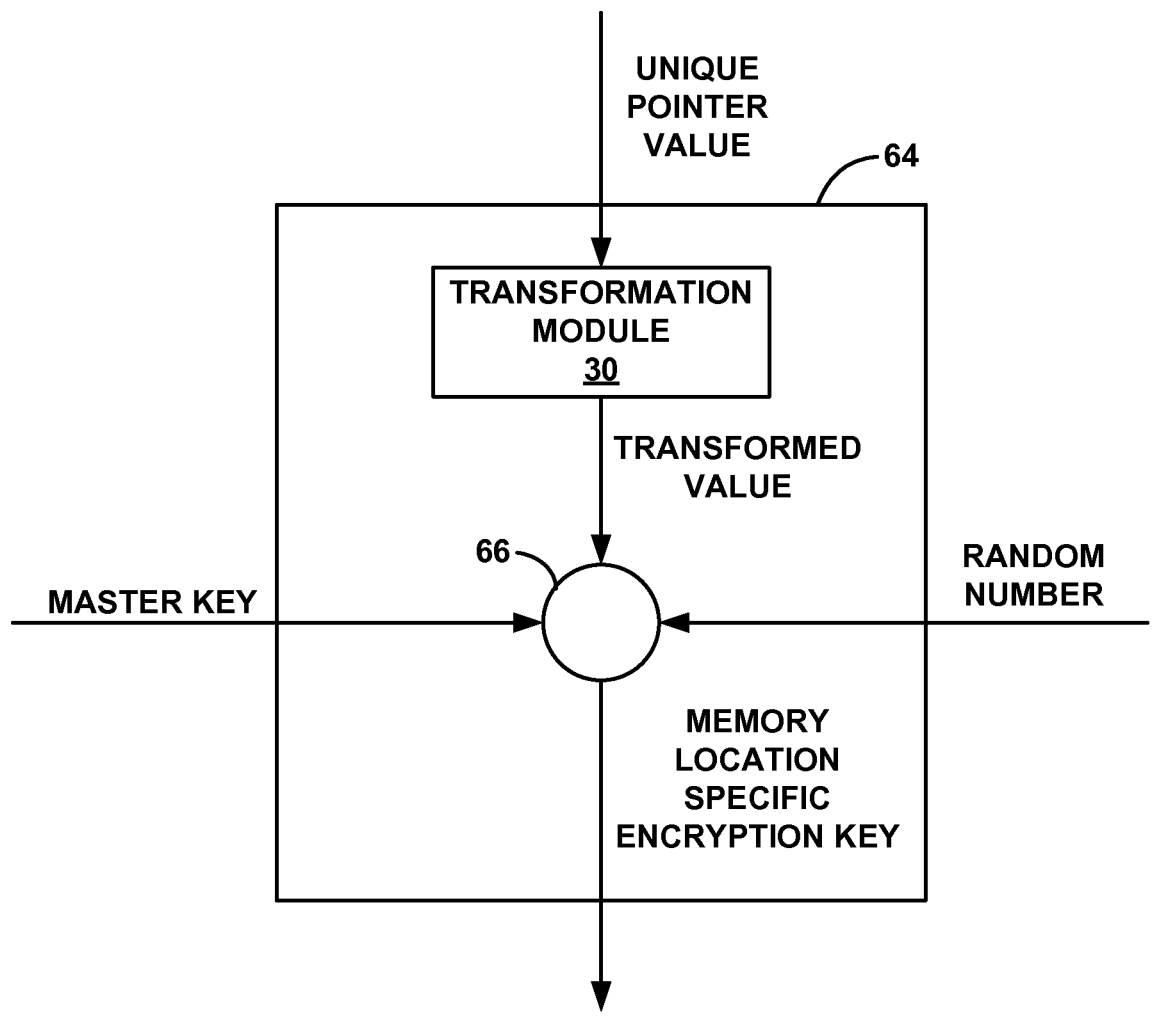
FIG. 6 is a functional block diagram of an example encryption key generation module of the system of FIG. 5, where the encryption key generation module is configured to generate a unique encryption key for data stored to a particular memory location based on a random number, a master key value, and a unique pointer associated with the memory location.

FIG. 6 is a functional block diagram of an example encryption key generation module 64 (also referred to as "key generation module 64"), which is configured to generate a unique encryption key for data stored to a particular memory location based on a random number, a master key value, and a unique pointer associated with the memory location. As shown in FIG. 6, key generation module 64 receives a unique pointer value that indicates a location within memory 12 at which data to be encrypted is to be stored, a master key value, and a random number. In some examples, processor 16 provides the unique pointer value, master key value, and random number to key generation module 64. In other examples, these values may be provided to key generation module 64 from another component, such as directly from internal memory 22 or from another processor.

As described above with respect to FIG. 2, transformation module 30 is configured to implement any suitable transformation algorithm to transform the unique key value into a unique transformed value. Transformation module 30 outputs a transformed value, which is then combined with the random number and the master key value via combination function 66 to generate a memory location specific encryption key. As with the example shown in FIG. 2, in some examples, key generation module 64 may be configured to combine the unique pointer value with a first random value before passing the value through the transformation module 30 to generate the transformed value. The first random value can be the same as, or different than, the second random number combined with the transformed pointer value.

Key generation module 64 outputs the memory location specific encryption key, as shown in FIGS. 5 and 6, which is received by encryption and decryption module 20 as an input. Encryption and decryption module 20 is configured to encrypt data to be written to memory 12 using the location specific key encryption key generated by key generation module 64.

Figure 7:
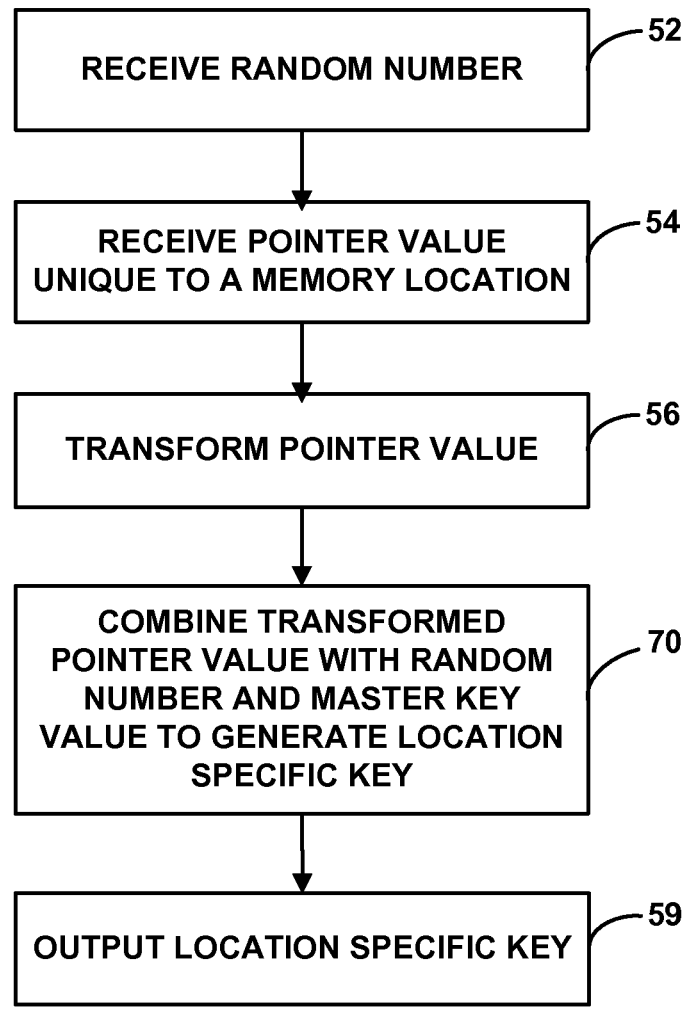
FIG. 7 is a flow diagram of an example technique with which key generation module may generate an encryption key based on a unique pointer value associated with a respective memory location, a random number, and a master key value.

FIG. 7 is a flow diagram of an example technique with which key generation module 64 may generate an encryption key based on a unique pointer value associated with a respective memory location, a random number, and a master key value. While FIG. 7 is described with respect to key generation module 64 (FIGS. 5 and 6), in other examples, the technique shown in FIG. 7 can be implemented by another system alone or in combination with key generation module 64.

The technique shown in FIG. 7 is similar to that shown in FIG. 4. However, after key generation module 64 receives a random number (52), receives the pointer value unique to a memory location to which data encrypted using the encryption key generated by key generation module 64 is to be stored (54), and transforms the pointer value (56), key generation module 64 may combine the transformed pointer value with the random number and a master key value to generate the memory location specific encryption key (70). Key generation module 64 may then output the memory location specific encryption key, e.g., to encryption and decryption module 20 (59).

Figure 8:
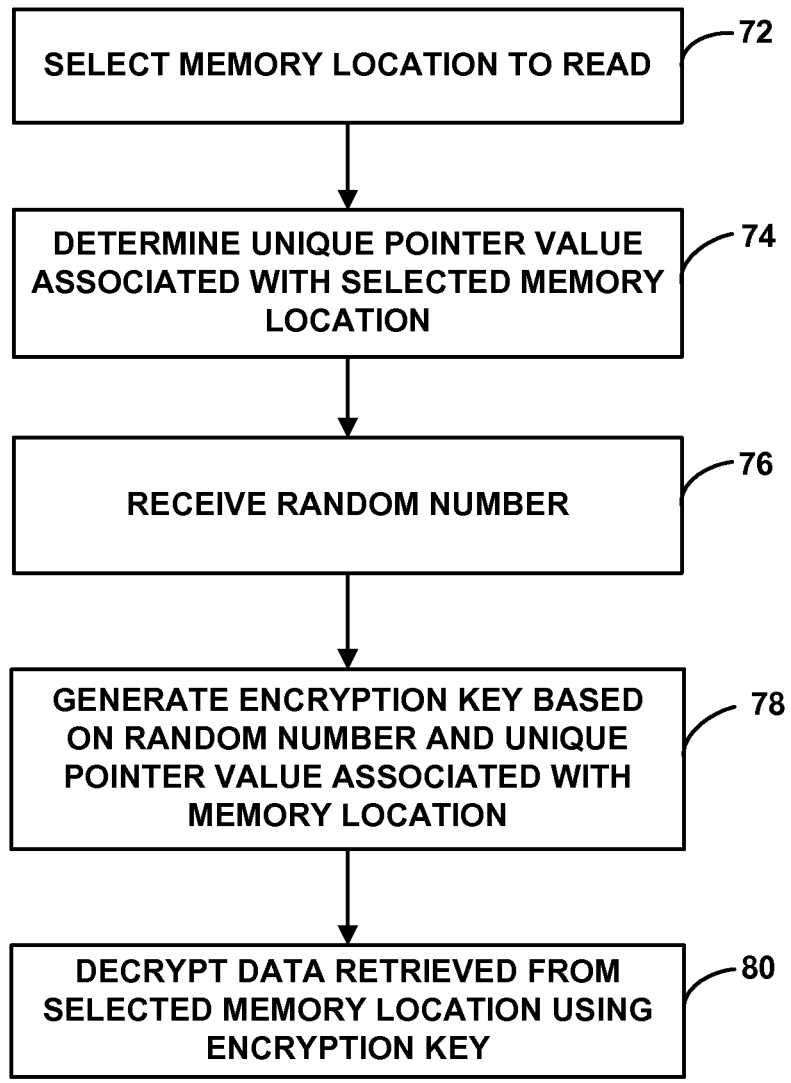
FIG. 8 is a flow diagram of an example technique with which data stored by memory 12 may be decrypted.

FIG. 8 is a flow diagram of an example technique with which data stored by memory 12 may be decrypted. The technique shown in FIG. 8 may be implemented, for example, during a read operation controlled by processor 16 of system 15 or a processor of another device. While FIG. 8 is primarily described with reference to system 10 (FIGS. 1 and 2), in other examples, the technique shown in FIG. 8 may be implemented by another system, such as system 60 (FIGS. 5 and 6).

In accordance with the technique shown in FIG. 8, processor 16 selects a memory location from which data is to be read (72). Processor 16 may select the memory location in response to, for example, receiving instructions (e.g., from a user or another electric device) requesting the data stored at the memory location. Processor 16 may also determine the unique pointer value associated with the selected memory location (74), such by determining the memory address or the packet identifier of the packet used to transmit the data to memory 12 when the data was written to memory 12.

In order to decrypt the data stored by memory 12 at the selected location, processor 16 may need to re-determine the encryption key. As part of this process, processor 16 may determine the random number that was implemented by key transformation module 18 at the time the data was written to the selected memory location (76). In some examples, processor 16 determines the random number by accessing internal memory 22 and determining the random number that is associated with the selected memory location in internal memory 22. In other examples, processor 16 may determine the time at which the data was written to the memory location and determine the random number associated with that time (e.g., based on information stored by internal memory 22). As another example, processor 16 may determine the power cycle during which the data was written to the memory location and determine the random number associated with that power cycle (e.g., based on information stored by internal memory 22). Other techniques may be used to retrieve the random number used by key transformation module 18 at the time the data was written to the selected memory location.

After determining the random number, processor 16 may provide the random number and unique pointer value to key generation module 18, which may then generate the encryption key based on the random number and unique pointer value, e.g., using the technique described with respect to FIG. 3 or FIG. 7 (78). Key generation module 18 may output the encryption key to encryption and decryption module 20, which may then decrypt data retrieved from the selected memory location using the encryption key (80).

In some examples, in order to read data from and write data to memory 12, processor 16 maps a memory address location specified by an internal memory bus to a physical location within external memory 12. The memory address location specified by the internal memory bus of processor 16 may be the same as the memory location used by the external memory space or may linearly map to a memory address of the external memory space. In other examples, however, in addition to or instead of encrypting memory contents using based on a random number and a pointer value that is unique to the memory location and associated with the memory location, the memory address specified by the internal memory bus may be non-linearly translated to a external memory address, and control system 14 may write the data to the translated memory address. For example, processor 16 of system 10 may implement a non-linear address translation algorithm (e.g., using a random number) to translate a memory address specified by the internal memory bus (internal to control system 14) to determine the location of external memory 12 at which data is to be stored. This non-linear translation of an internal memory bus memory address may obfuscate memory contents to reduce the ability of an adversary to obtain information stored by memory 12, e.g., by obfuscating the memory contents at rest, as well as by obfuscating external data traffic to and from memory 12. When used with the memory encryption algorithms described herein, the non-linear address translation algorithm may further reduce the ability of an adversary to obtain information via side channel attacks.

As with the memory encryption algorithms described herein, the random number used in the non-linear address translation algorithm may be generated at some predetermined time, such as upon power-up of system 10, at regular intervals (e.g., once every hour, every day, or the like), or according to some other predetermined schedule with which processor 16 is programmed. In some cases, in order to help ensure two or more memory locations of the internal memory bus are not translated to the same external memory location, the predetermined schedule may be also be a schedule upon which the external memory 12 is cleared (e.g., upon power-up of system 10).

In examples in which the contents of memory 12 are encrypted based on the unique pointer value and a random number, processor 16 may use a pointer value unique to the memory address used by the internal memory bus of control system 14 or a pointer value unique to the translated external memory address to encrypt the memory contents. In addition, the random number may be the same as, or different than, the random number used to encrypt the contents of memory 12 stored at the memory location associated with the memory location specified by the internal memory bus.

Figure 9:
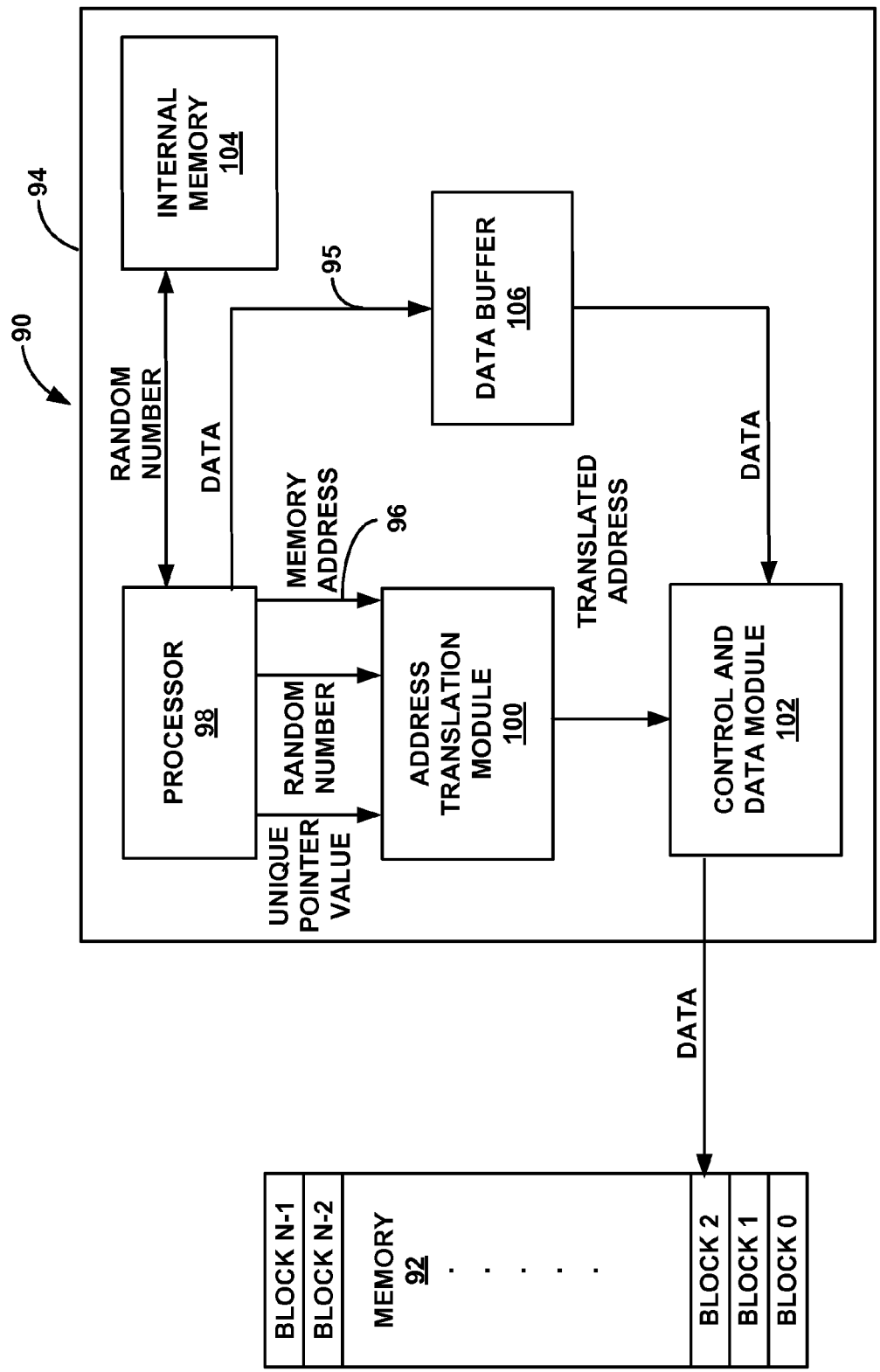
FIG. 9 is a functional block diagram of an example system that includes an external memory and an address translation module that is configured to translate a memory address specified by an address bus to a translated memory address that maps to the external memory.

FIG. 9 is a functional block diagram of system 90, which includes memory 92 and control system 94. Memory 92 is external to control system 94. Control system 94 is configured to translate a memory address specified by an internal memory address bus 96 to an external memory address. Control system 94 comprises processor 98, address translation module 100, control and data module 102, internal memory 104, and data buffer 106. In some examples, memory 92, processor 98, internal memory 104, and data buffer 106 may be similar to memory 12, processor 16, internal memory 22, and data buffer 24, respectively, of system 10 (FIG. 1).

Control system 94 can comprise any suitable arrangement of hardware, software, firmware, or any combination thereof, to perform the techniques attributed to control system 14 and, e.g., processor 98, address translation module 100, and control and data module 102 herein. For example, control system 14 may include any one or more microprocessors, DSPs, ASICs, FPGAs, or any other equivalent integrated or discrete logic circuitry, as well as any combinations of such components. Although processor 98, address translation module 100, and control and data module 102 are described as separate modules, in some examples, processor 98, address translation module 100, and control and data module 102 can be functionally integrated. For example, address translation module 100, and control and data module 102 may be provided by the same hardware. In some examples, processor 98, address translation module 100, and control and data module 102 correspond to individual hardware units, such as ASICs, DSPs, FPGAs, or other hardware units, or one or more common hardware units.

Memory 92 may be configured to store data in unencrypted or encrypted form. Memory 92 may include any volatile or non-volatile media, such as a RAM, ROM, NVRAM, EEPROM, flash memory, and the like. In some examples, memory 92 may be external to control system 94, e.g., may be external to a package in which control system 94 is housed. For example, control system 94 may be defined by a semiconductor device or a plurality of semiconductor devices and may be housed in a semiconductor package, and memory 92 may be external to that semiconductor package. In some of these examples, electrical signals transmit between memory 92 and control system 94 via one or more electrically conductive pathways (e.g., a data bus and address bus). In other examples, memory 92 and control system 94 may wirelessly communicate with each other.

Processor 98 of control system 94 is configured to control the writing of data to memory 92 and reading of data from memory 92. In this way, processor 98 may also be referred to as a memory controller. In some examples, processor 98 may be configured to select (e.g., determine) the data to be written to memory 92. For example, processor 98 may generate the data or may receive the data to be written to memory 92 from an external source, such as an external component (e.g., an external computing device) or a user interface (not shown in FIG. 9) that is electrically and communicatively connected to processor 98. Processor 98 may include internal memory data bus 95 and internal memory address bus 96, which is used to specify a location within memory 12 to which data is written to or read from. Internal memory data bus 95 and internal memory address bus 96 are internal to control system 14. Processor 98 may be configured to select a location within memory 92 to which the data is to be written and determine the unique pointer value associated with the memory location; this unique pointer value (e.g., any memory address that maps to a location within memory 92) is then specified on address bus 96.

Processor 98 can select a location within memory 92 to which the selected data is written using any suitable technique, such as the techniques described above with respect to processor 16. Physical locations within memory 92 can be divided into blocks, and the base of each block may be associated with a unique pointer value (e.g., a memory address for one or more memory locations in the block). The size of each block may differ depending on the specification application for which memory 12 is used. In this way, the unique pointer value may be associated a physical location within memory 12. Each memory location within memory 92 may be associated with a respective memory address, such that when processor 98 selects a memory address to read data from or write data to, only one location in memory 92 is accessed by processor 96. In this way, the memory address may be a unique pointer value for a memory location. Data within memory 92 may be organized using logical addresses, which may map to physical addresses.

In examples in which memory 92 and control system 94 communicate over a communication channel, whether wired or wireless, the unique pointer may be, for example, a packet identifier for a data packet sent over a communications link, where the data packet includes the data to be written to a selected memory location. However, memory addresses are primarily referred to throughout the description of FIG. 9, as well as FIGS. 10 and 11 for ease of description.

In some examples, the data to be written to memory 92 under the control of processor 98 is stored in data buffer 106. In some examples, data buffer 106 can be a part of internal memory 104 of control system 94 or can be separate from internal memory 104. Internal memory 104 is internal to control system 94 and, in some examples, stores instructions for execution by processor 98 for operation of processor 98 and other data used during operation of control system 94. In some examples in which control system 94 is an ASIC, FPGA or another integrated circuit, or otherwise comprises an ASIC, FPGA or another integrated circuit, internal memory 102 can be a memory element of the integrated circuit (e.g., a memory block or a flip-flop).

Electrically conductive pathways between control system 94 and components external to system 94, including memory 92, may provide a channel through with which system 90 can be electrically tampered. In order to help minimize the possibility that any information obtained from probing the electrical signal traces between memory 92 and control system 94, control system 94 is configured to obfuscate contents of memory 92 and external traffic between control system 94 and memory 92. The technique implemented by control system 94 is described with respect to FIG. 10.

Figure 10:
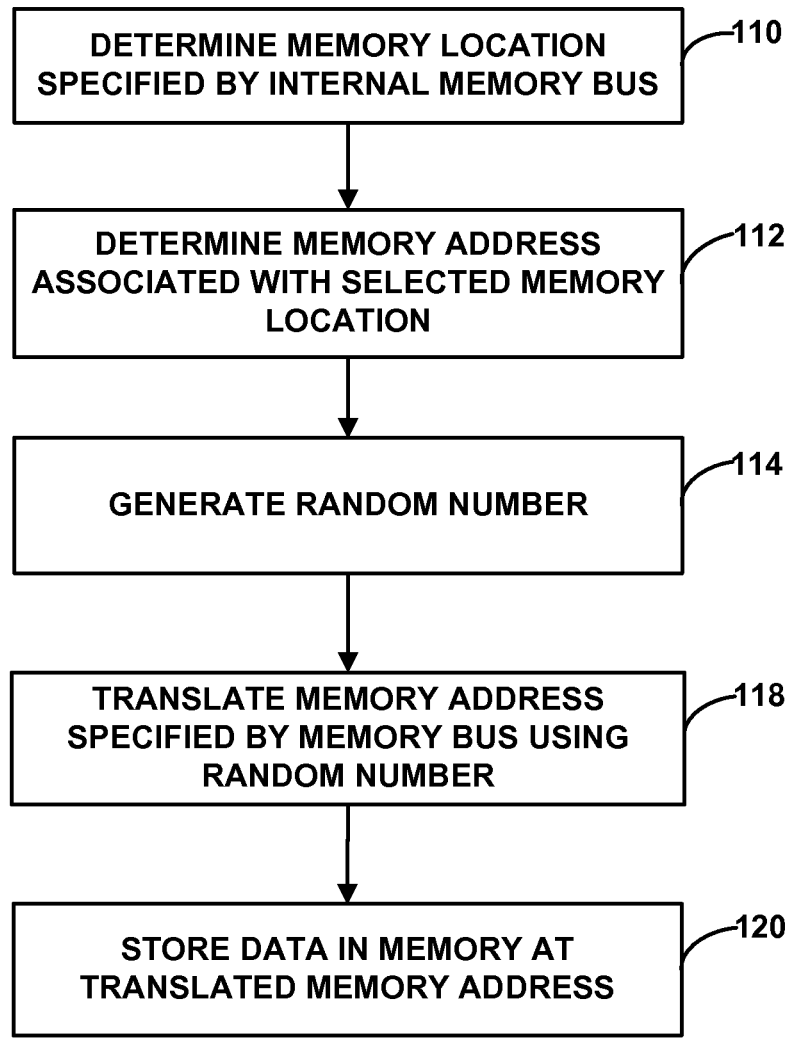
FIG. 10 is a flow diagram of an example technique with which the system of FIG. 9 may translate a memory address specified by an address bus based on a random number.

FIG. 10 is a flow diagram of an example technique that may be implemented by processor 98 or another processor in order to translate a memory address specified by internal bus 96 to an external memory address that maps to a physical location in memory 92. While FIG. 10 is described with respect to processor 98, in other examples, another processor in addition to or instead of processor 98 may implement all or part of the technique shown in FIG. 10. In addition, while FIG. 10 is described with respect to a memory address, in other examples, other unique pointer values may be used, such as a packet address.

As shown in FIG. 10, in order to write to memory 92 or read data from memory 92, processor 98 determines a memory location specified by internal memory bus 96 (110). Processor 112 determines a memory address associated with the selected memory location (112). Processor 112 also generates a random number (114), which may generated at any time prior to the translation of the memory address. The random number may be generated using any of the techniques described above with respect to the random number used to generate a memory location specific encryption key. In some examples, the random number is an M-bit seed value, where "M" is the same bit length as the memory address.

In some examples, the random number is generated upon power-up of system 90 and memory 92 is clear at the beginning of each power-up cycle, such that the random number remains the same throughout the storage and retrieval of data from memory 92. That is, processor 98 may know at all times what random number is needed to translate a memory address specified by memory bus 96 to the translated memory address because processor 98 may merely determine the most recently generated random number. In some examples, e.g., as shown in FIG. 9, processor 98 stores the random number in internal memory 104. In other examples, processor 98 generates the random number at another time, which may correspond to a memory clearing cycle, such that the same random number is used to write to and read from memory 92. While for two different memory clearing cycles, two different random numbers may be used to translate the memory address, the previous random numbers are not needed to access memory 92 because all data written to memory 92 using the previous random numbers are cleared from memory 92 prior to writing data to memory 92 and reading data from memory 92 using the most recently generated random number.

Address translation module 110 receives the unique pointer value, random number, and memory address from processor 98 (as shown in FIG. 9). Address translation module 110 may then translate the memory address specified by memory bus 96 using the random number (118), thereby generating a translated memory address. An example functional block diagram of address translation module 100 is shown in FIG. 11.

Figure 11:
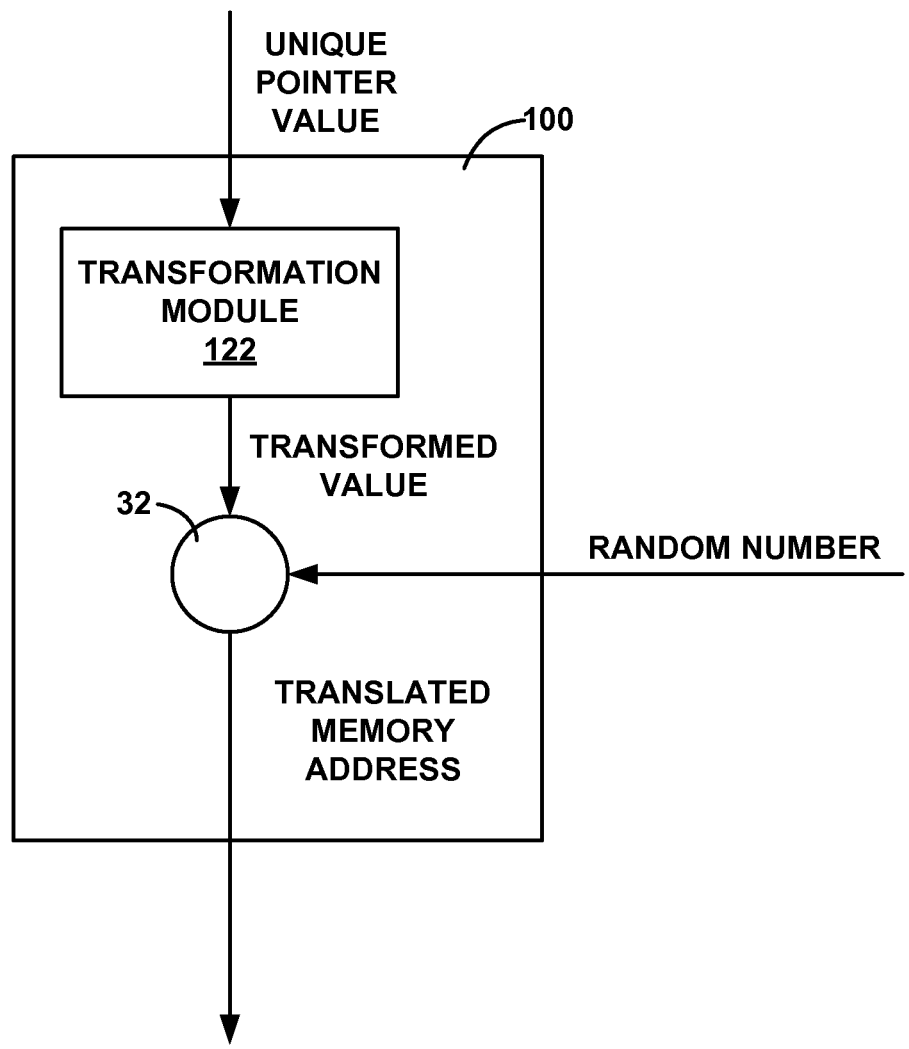
FIG. 11 is a functional block diagram of an example address translation module of the system of FIG. 9.

FIG. 11 is a functional block diagram of an example address translation module 110, which is configured to generate a translated memory address based a random number and a unique pointer value associated with the memory location. The unique pointer value may be, for example, a memory address. FIG. 11 is described with respect to a memory address, but, in other examples, the unique pointer value may be another value, such as a packet identifier. The translated memory address corresponds to a physical location in memory 92. As shown in FIG. 11, a unique pointer value associated with the memory location, such as a memory address or a unique packet identifier for a packet of data sent over a communication channel (e.g., a wired or wireless communication channel), undergoes a transformation, which is shown as being implemented by transformation module 122 of address translation module 110.

Transformation module 122 may be implemented by hardware, software, firmware or any combination thereof and may be similar to transformation module 30 (FIG. 2). Transformation module 122 implements any suitable transformation algorithm (e.g., a transformation function) that results in a unique value. As with transformation module 30, the transformation algorithm can be selected such that there is one-to-one mapping of input value (e.g., the unique pointer value) to output value (e.g., the transformed value), and such that there is no aliasing (e.g., such that two or more input values do not result in the same output value). In some examples, the transformation algorithm is non-linear, and in these examples, no proportional relationship exists between the value input to the transformation algorithm and the value output from the algorithm. Using these parameters and other parameters, the selected transformation algorithm may be selected such that it is resistant to linear and differential cryptanalysis, as well as algebraic attacks.

An example of a non-linear transformation algorithm that transformation module 122 may implement to transform the unique pointer value includes a Substitution-box. Instead of, or in addition to, the Substitution-box, in some examples, transformation module 122 may transform the memory address using an independent crytopographic algorithm, such as using AES, RC5, or DES algorithms, or any combination thereof. However, the transformation algorithm implemented by transformation module 122 is not necessarily cryptographic in all examples.

Transformation module 122 outputs a transformed value, which results when the unique pointer associated with the memory location specified by address bus 96 undergoes the transformation. The transformed value is combined with the random number using combination function 124, as shown in FIG. 11, and the result of this combination is a translated memory address. Combination function 124 may be similar to combination 32 (FIG. 2).

In some examples, address translation module 100 combines the pointer value with a first random value before passing the value through the transformation module 122 to generate the transformed value. The first random value can be the same as, or different than, the random number used combined with the transformed value, which can be referred to as a "second" random number for ease of description and without regard to the order in which the random numbers are generated. As with the second random number, in some examples, processor 98 (or another processor internal to or external to control system 94) generates the first random value at some predetermined time, such as upon power-up of system 90, at regular intervals (e.g., once every hour, every day, or the like), or according to some predetermined schedule with which processor 98 is programmed. The timing with which the first random number is generated may be the same as, or different than, the timing with which the second random number is generated.

In some examples, the address translation algorithm implemented by address translation module 100 may be implemented by digital hardware, such that it does not impact the on-chip software memory map of control system 90.

Address translation module 100 outputs a translated memory address (as shown in FIG. 9), which is received by control and data module 102 as an input. Processor 98, e.g., via control and data module 102, is configured to write the data to memory 92 or read the data from memory 92 using the translated memory address. For example, in response to receiving the translated memory address from address translation module 100 and data from data buffer 106, control and data module 102 may write the data to the memory location in memory 92 that corresponds to the translated memory address.

Translating a memory address using a random number may provide a safeguard against the unauthorized retrieval of data from memory 19. For example, because the memory address specified by address bus 96 is non-linearly transformed using the random number, control system 94 may write data to memory 92 such that adjacent data blocks do not store information intended to be stored together.

In some digital systems, such as systems using embedded processors, application data is loaded into external memory 92 (e.g., RAM) in a deterministic fashion, once the system reset is negated. Such digital systems may be vulnerable to attacks. For example, the system may be repeatedly reset, thereby allowing aggregation of side channel samples on a single memory address or over a range of memory addresses. Translating a memory address specified by memory bus 96 prior to writing data to memory 92 may mitigate this sort of attack. The random number used to translate the memory address may be unique, such that the memory address translation algorithm will be unique following each power cycle or system reset. Accordingly, the address mapping between the internal bus 96 and the physical memory 92 address will be unique, so the same contents will be stored and accessed at different addresses following each power cycle or system reset. In addition, because a non-linear transformation is used to translate the memory address, consecutive memory addresses specified by memory bus 96 will most likely not be adjacent to each other within the physical memory 92 space. This may make an attack on system 90 relatively cumbersome because a memory dump of any two systems will most likely be different, even if the two systems are performing identical internal operations.

Translating a memory address may also provide performance benefits to system 90. With some nonvolatile storage devices, an overhead may be associated with performing a transaction, such as writing data to or reading data from memory 92. Consequently, throughout may be higher for larger transaction sizes. To help avoid the performance penalty associated with smaller transactions, the addressable block sizes of memory 92 may be the largest supported transaction size of the requesting node (e.g., control system 94). Otherwise, a larger transaction request on an internal address bus 96 may have to be broke into smaller transaction sizes to access memory 92. For example, if processor 98 is an embedded processor and memory 92 is RAM, memory 92 may be accessed on a cache miss. In this case, the block sizes of memory 92 should be the same size as a cache line fetch of control system 14. This may be accomplished by, for example, truncating the lower bits of the memory address and only translating the upper address bits. Thus, in some cases, only some memory address bits may be translated.

In some cases, system 90 may implement both a memory location specific encryption key to encrypt data and the memory location translation algorithm to write the data to memory 92. For example, system 90 may include key generation module 18 or 64 (FIGS. 1 and 5, respectively), which may generate an encryption key using the memory address specific by internal address bus 96, rather than the translated memory address, e.g., using the techniques described above with respect to FIGS. 1-8. System 90 may further include encryption and decryption module 20 (instead of or in addition to control and data module 102), which may encrypt the data using the memory location specific encryption key, receive the translated memory address from address translation module 100, and write the encrypted data to the memory location specified by the translated memory address.

When combined with the memory location specific encryption algorithm (e.g., as described above with respect to FIGS. 1-8), translating a memory address prior to accessing memory 92 may further reduce information available to an adversary. For example, only the translated memory address may be visible to the adversary and the memory address specified by internal address bus 96 and used to generate the encryption key may remain internal to control system 94. This may obfuscate the un-translated address value from the visibility of the adversary. Accordingly, even if the adversary gains access to the translated memory address, the adversary may not be able to determine the encryption key used to encrypt the data contents stored at the memory location corresponding to the translated memory address without further determining the memory address specified by internal address bus 96 (which was used to generate the encryption key), the one or more random numbers used to generate the encryption key, and, in some cases, the master key value.

Moreover, translating the memory address may reduce the ability of the adversary to take repeated side channel measurements (e.g., taken as part of a side channel attack) on a specific address by resetting or power cycling the system because the memory address may change with each power cycle or system reset (e.g., if the random number used to translate the memory address is reset with each power cycle or system reset). Thus, translating the memory address may make it difficult for an adversary to acquire a statistically significant number of power readings at any one address during a side channel attack. Even if the adversary cracks the memory address translation algorithm, the adversary will further have to determine the memory encryption key. In this way, using both the memory location specific encryption algorithm and unique pointer value translation algorithm may provide two levels of protection against unauthorized access to contents of memory 92.

Figure 12:
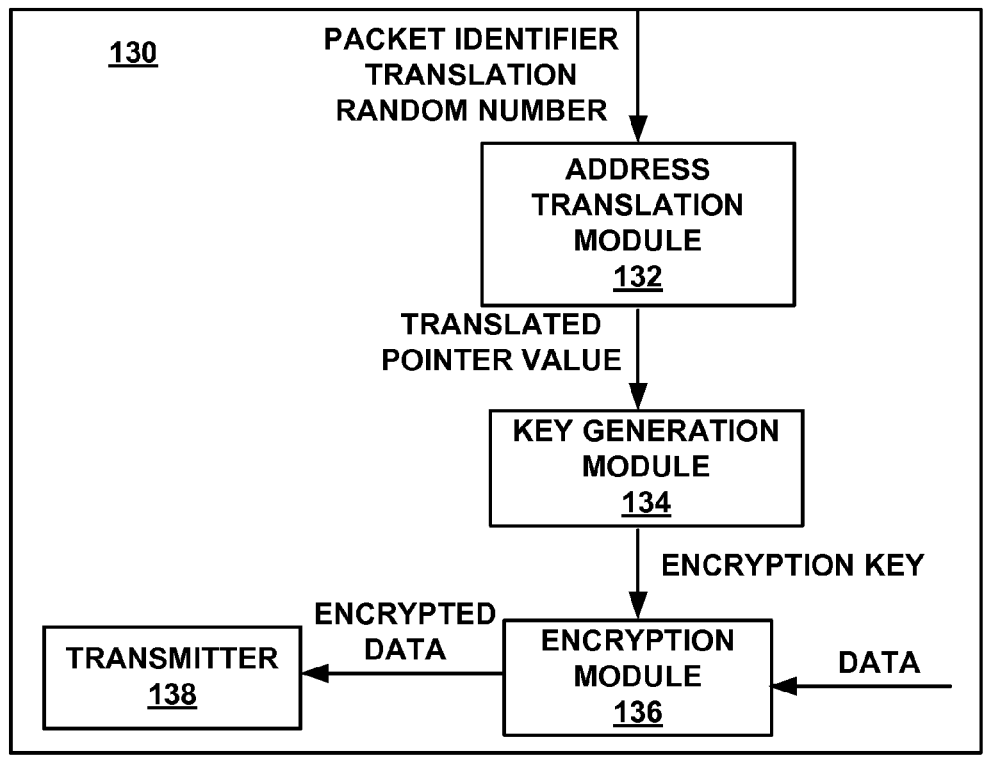
FIG. 12 is a functional block diagram of an example system that may transmit a data packet that includes data encrypted using a memory location specific encryption algorithm to a receiving node (or system).
Figure 13:
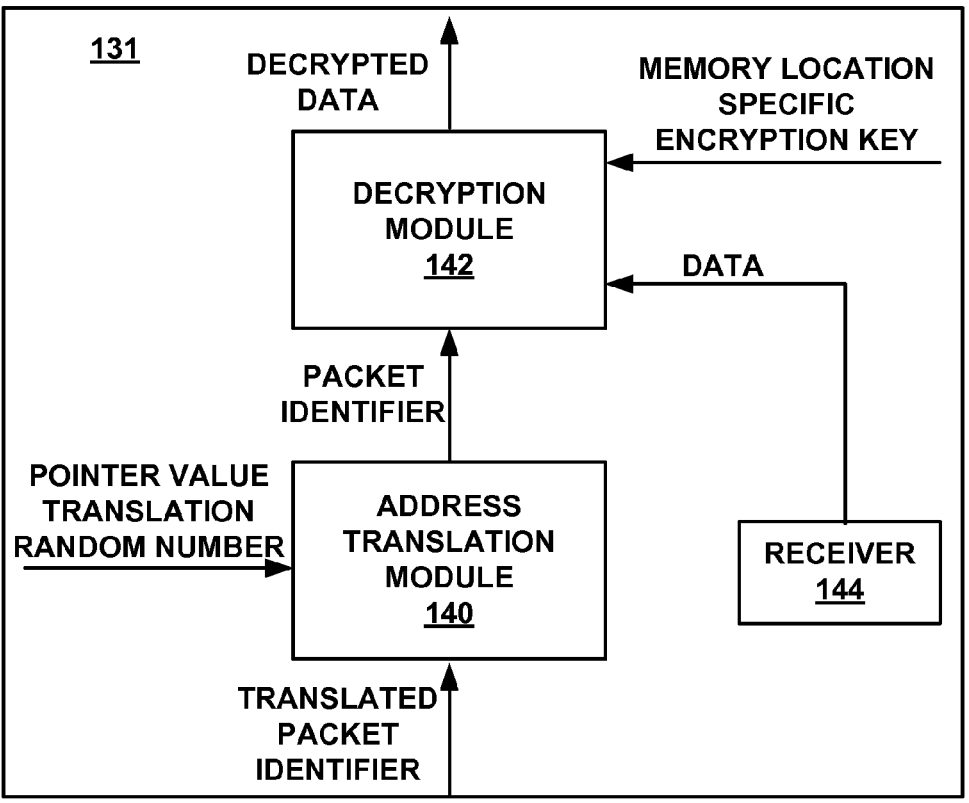
FIG. 13 is a functional block diagram of an example system that may receive a data packet that includes data encrypted using a memory location specific encryption algorithm.

The technique described with respect to FIGS. 9-11 may also be applied to transmission protocols as well as memory content encryption. A secure exchange may be performed between two nodes (e.g., systems with respective encryption/decryption modules, or one system with an encryption module and another system with a decryption module). FIG. 12 is a functional block diagram of an example of a transmitter node 130 that may transmit encrypted data and FIG. 13 is a functional block diagram of an example receiver node 131 that may receive the transmitted encrypted data. In some examples, a system may include nodes that have both transmitter and receiver node capability.

As shown in FIG. 12, transmitting node 130 may comprise address translation module 132, key generation module 134, encryption module 136, and transmitter 138. In some examples, address translation module 132 may be similar to address translation module 100 (FIGS. 9 and 11). In addition, in some examples, key generation module 134 may be similar to key generation module 18 (FIGS. 1 and 2) or key generation module 64 (FIGS. 5 and 6) and encryption module 136 may be similar to encryption and decryption module 20 (FIGS. 1 and 5).

As shown in FIG. 13, receiving node 131 may comprise address translation module 140, decryption module 142, and receiver 144. In some examples, address translation module 140 may be similar to address translation module 100 (FIGS. 9 and 11). In addition, in some examples, decryption module 142 may be similar to encryption and decryption module 20 (FIGS. 1 and 5).

During communication of encrypted data between nodes 130, 131, a memory location specific encryption key value and the random number used to translate the pointer value can be exchanged between nodes 130, 131 without intercept by a third party adversary. The memory location specific encryption key value may be, for example, an encryption key generated based on a random number (e.g., as described with respect to FIGS. 1-8), based on a master key value that does not change over time, or both. An example exchange system that may be used is the Diffie-Hellman key exchange, which allows two parties that have no prior knowledge of each other to jointly establish a shared secret key over an insecure communications channel.

Once each of the nodes 130, 131 has both the encryption key that was used to encrypt the contents of the data packet (e.g., as described with respect to FIGS. 1-8), the random number used to translate the unique pointer value, and, if relevant, the random number used to generate the encryption key for the data packet, enciphered content can be shared between nodes 130, 131. For example, address translation module 132 of transmitting node 130 may translate a unique pointer value, which, in the example shown in FIGS. 12 and 13, is a data packet identifier. Key generation module 134 may then generate an encryption key unique to the data packet using the translated data packet identifier. Encryption module 136 may encrypt data using the generated encryption key, and transmitter 138 may transmit the data to receiving node 131.

Upon receipt of a data packet from transmitting node 130, via receiver 144, receiving node 131 may reverse the address translation using address translation module 140 to determine the address value used to generate the encryption key, and use the address value to derive the memory location specific encryption key using decryption module 142 or a key generation module similar to key generation module 18 or 64 described above. Decryption module 142 may then decrypt the data packet using the key determined based on the data packet identifier and the memory location specific encryption key. In some examples, the location specific encryption key may act as a pointer to the location of the data packet within the overall block of data being transmitted, allowing the data packets to be sent out of order.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described encryption, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

The invention claimed is:

1. A method comprising:
   selecting a memory location within a memory;
   generating an encryption key for encrypting data to be stored by the memory at the selected memory location, wherein generating the encryption key comprises generating the encryption key based on a random number and a pointer value that is unique to the memory location and associated with the memory location; and
   encrypting the data to be stored by the memory at the selected memory location using the encryption key.

2. The method of claim 1, wherein generating the encryption key comprises:
   determining the pointer value that is unique to the memory location and associated with the memory location;
   transforming the pointer value using a known algorithm to generate a transformed pointer value; and
   combining the transformed pointer value with a random number to generate an encryption key.

3. The method of claim 2, wherein the known algorithm comprises a non-linear transformation function.

4. The method of claim 2, wherein combining the transformed pointer value with the random number to generate the encryption key comprises combining the transformed pointer value with the random number and a master key value to generate the encryption key.

5. The method of claim 1, further comprising generating the random number.

6. The method of claim 5, wherein generating the random number comprises generating the random number that is at least one of unique to a power-up cycle of a system comprising the memory or based on a time at which the data to be stored by the memory at the selected memory location is written to the memory.

7. The method of claim 1, wherein the pointer value comprises at least one of a memory address or a packet identifier for a data packet comprising the data to be stored by the memory at the selected location.

8. The method of claim 1, further comprising:
   storing the encrypted data in the memory at the selected memory location; and
   decrypting the encrypted data stored by the memory at the selected memory location using the encryption key.

9. The method of claim 8, wherein decrypting the data stored by the memory at the selected memory location comprises:
   determining the random number;
   determining the pointer value that is unique to the selected memory location;
   transforming the pointer value using the known algorithm to determine the transformed pointer value;
   generating a decryption key by at least combining the random number with the transformed pointer value; and
   decrypting the data stored by the memory at the selected memory location using the decryption key.

10. The method of claim 9, wherein determining the random number comprises:
    determining at least one of a power cycle during which the data stored by the memory at the selected memory location was encrypted or a time at which the data was written to the memory at the selected location; and
    determining the random number associated with the at least one of the power cycle or the time.

11. The method of claim 1, wherein the memory location comprises a first memory location, the method further comprising:
    translating the pointer value to generate a translated memory location; and
    storing the data in the memory at a second memory location corresponding to the translated pointer value.

12. A system comprising:
    a memory configured to store data, the memory comprising a plurality of memory locations each associated with a respective unique pointer value;
    a processor configured to select a memory location of the plurality of memory locations to which data is to be written;
    a key generation module configured to generate an encryption key based on a random number and the unique pointer value associated with the selected memory location; and
    an encryption and decryption module configured to encrypt the data using the encryption key.

13. The system of claim 12, wherein the key generation module is configured to generate the encryption key by at least transforming the unique pointer value associated with the selected memory location using a known algorithm to generate a transformed pointer value, and combining the transformed pointer value with a random number.

14. The system of claim 13, wherein the key generation module is configured to transform the unique pointer value associated with the selected memory location with a non-linear transformation algorithm.

15. The system of claim 13, wherein the processor is configured to store the encrypted data in the memory at the selected location and the encryption and decryption module is configured to decrypt the encrypted data stored by the memory at the selected memory location by at least determining the random number, determining the unique pointer value associated with the selected memory location, transforming the pointer value using the known algorithm to determine the transformed pointer value, generating a decryption key by at least combining the random number with the transformed pointer value, and decrypting the data stored by the memory at the selected memory location using the decryption key.

16. The system of claim 12, wherein the key generation module is configured to generate the encryption key by at least transforming the unique pointer value associated with the selected memory location and combining the transformed pointer value with a random number and a master key value.

17. The system of claim 12, wherein the random number is at least one of unique to a power-up cycle of a system comprising the memory or based on a time at which the data to be stored by the memory at the selected memory location is written to the memory.

18. The system of claim 12, wherein the pointer value comprises at least one of a memory address or a packet identifier for a data packet comprising the data to be stored by the memory at the selected location.

19. The system of claim 12, wherein the memory location comprises a first memory location, the system further comprising a memory address translation module configured to translate the pointer value to generate a translated memory location, wherein the processor is configured to store the encrypted data in the memory at a second memory location corresponding to the translated pointer value.

20. A non-transitory computer-readable medium comprising instructions that upon execution cause a processor to:
   select a memory location within a memory;
   generate an encryption key for encrypting data to be stored by the memory at the selected memory location based on a random number and a pointer value that is unique to the memory location and associated with the memory location; and
   encrypt the data to be stored by the memory at the selected memory location using the encryption key.

* * * * *